(12) United States Patent
Whittenberger et al.

(10) Patent No.: US 7,614,057 B2
(45) Date of Patent: Nov. 3, 2009

(54) ENTITY LINKING SYSTEM

(75) Inventors: Kevin Whittenberger, Woodinville, WA (US); Sonja Jackson, Bellevue, WA (US); Jason Ladwig, Duvall, WA (US); Sudhir Nanda, Fargo, ND (US)

(73) Assignee: Microsoft Corporation, Redmond, WA (US)

( * ) Notice: Subject to any disclaimer, the term of this patent is extended or adjusted under 35 U.S.C. 154(b) by 1075 days.

(21) Appl. No.: 10/435,629

(22) Filed: May 9, 2003

(65) Prior Publication Data

US 2004/0194112 A1 Sep. 30, 2004

Related U.S. Application Data

(60) Provisional application No. 60/453,727, filed on Mar. 28, 2003.

(51) Int. Cl.
  *G06F 9/54* (2006.01)
  *G06F 15/16* (2006.01)
(52) U.S. Cl. .......................... 719/310; 709/205
(58) Field of Classification Search ............... 719/310; 709/205
  See application file for complete search history.

(56) References Cited

U.S. PATENT DOCUMENTS

| | | | |
|---|---|---|---|
| 5,436,619 A | 7/1995 | Yun | 340/7.52 |
| 5,719,942 A * | 2/1998 | Aldred et al. | 709/228 |
| 5,960,178 A | 9/1999 | Cochinwala et al. | 709/232 |
| 6,073,142 A | 6/2000 | Geiger et al. | 715/500 |
| 6,226,630 B1 | 5/2001 | Billmers | 707/3 |
| 6,275,850 B1 | 8/2001 | Beyda et al. | 709/206 |
| 6,411,947 B1 | 6/2002 | Rice et al. | 706/47 |
| 6,505,237 B2 | 1/2003 | Beyda et al. | 709/206 |
| 6,732,185 B1 | 5/2004 | Reistad | 709/238 |
| 6,778,941 B1 | 8/2004 | Worrell et al. | 702/176 |
| 7,096,226 B2 * | 8/2006 | Brock et al. | 707/100 |
| 7,287,249 B2 * | 10/2007 | Coyle et al. | 717/168 |

(Continued)

FOREIGN PATENT DOCUMENTS

WO    WO 00/29924    5/2000

(Continued)

OTHER PUBLICATIONS

R. Clarke, D. Filippidou, P. Kardasis, P. Loucopoulos, R. Scott "*Integrating the Management of Discovered and Developed Knowledge*", In Proceedings of Panhellenic Conference on New Information Technology, NIT'98, Athens, Greece, Oct. 1998.

(Continued)

*Primary Examiner*—Hyung S Sough
*Assistant Examiner*—Abdou K Seye
(74) *Attorney, Agent, or Firm*—Westman, Champlin & Kelly, P.A.

(57) ABSTRACT

A linking system that assists in managing the linking of entities contained in messages between two business applications is disclosed. The linking system also assists in updating entities between two business applications when an entity is updated in one application. The linking system takes each entity and places identifying information for the entity in a record in a first table. The system then creates in a record in a second table indicating that the two records in the first table are linked. The linking system also can remove links or records from the tables, and can return to a user a list of records that are linked together.

28 Claims, 13 Drawing Sheets

U.S. PATENT DOCUMENTS

| | | | |
|---|---|---|---|
| 2002/0038228 A1* | 3/2002 | Waldorf et al. | 705/7 |
| 2003/0018808 A1 | 1/2003 | Brouk et al. | 709/238 |
| 2003/0041178 A1 | 2/2003 | Brouk et al. | 709/313 |
| 2003/0053459 A1 | 3/2003 | Brouk et al. | 370/392 |
| 2003/0126301 A1* | 7/2003 | Mason et al. | 709/310 |
| 2003/0233347 A1* | 12/2003 | Weinberg et al. | 707/3 |
| 2004/0024740 A1* | 2/2004 | McGeorge, Jr. | 707/1 |
| 2004/0078355 A1* | 4/2004 | Suresh | 707/1 |

FOREIGN PATENT DOCUMENTS

| | | |
|---|---|---|
| WO | WO 02/39353 | 5/2002 |

OTHER PUBLICATIONS

Kardasis et al., P., "Aligning Legacy Information Systems to Business Processes", Proceedings of the 10$^{th}$ Conference on Advantage Information Systems Engineering, CaiSE'98, Pisa, Italy, 812, Jun. 1998.

Vasters, Clemens F., "BizTalk™ Server 2000: A Beginner's Guide", Network Professional's Library, The McGraw-Hill Companies, Inc. 2001.

Partial European Search Report for related European Patent Application No. 04 007 249.8 filed Mar. 25, 2004.

Linthicum, David S.: "Enterprise Application Integration" May 2000, Addison-Wesley, XP002527698, ISBN: 0-201-61583-5, selected pp. 18-21 of Chapter 1 (Edfining EAI); selected pp. 23-36 of Chapter 2 (Data-Level EAI); selected pp. 163-176 of Chapter 9 (RPCs, Messaging, and EAI); selected pp. 291-317 of Chapter 18 (Message Brokers—The Preferred EAI Engine).

Bussler, C.: "The Role of B2B Engines in B2B Integration Architectures", Sigmod Record, [online], vol. 31, No. 1, Mar. 2002, XP002527699, Retrieved from the Internet: URL: http://delivery.acm.org/10.1145/510000/507351/p67-bussler.pdf?key1=507351&key2=2797122421&coll=GUIDE&dl=GUIDE, ACM &CFID=30759827&CFTOKEN=50460019.

Bussler C: "P2P in B2BI", System Sciences, 2001, HICSS, Proceedings of the 35th Annual Hawaii International Conference on Jan. 7-10, 2001, Piscataway, NJ, USA, IEEE, Los Alamitos, CA, USA, Jan. 7, 2001, pp. 3947-3956, XP010587728, ISBN: 978-0-7695-1435-2.

Linthicum D. S.: "B2B Application Integration: E-Business-Enable Your Enterprise", B2B Application Integration: E-Business-Enable Your Enterprise, XX, XX, Aug. 1, 2001, pp. 261-276, XP002253450.

Pusnik, M et al.: "Evaluation of Technologies for Business Process Automation", Informatica Slovene Soc. Informatika Slovenia, [online] vol. 26, No. 4, Dec. 2002, pp. 373-380, XP002527700, ISSN: 0350-5596, Retrieved from the Internet: URL: http://ai.ijs.si/mezi/informatica/Informatica/Vol26/4_5_Pusnik.pdf.

* cited by examiner

ENTITY LINKING SYSTEM

CROSS-REFERENCE TO RELATED APPLICATION

This application claims priority from U.S. Ser. No. 10/402,379, which was filed Mar. 28, 2003, and was converted to Provisional Application Ser. No. 60/453,727 with a petition filed Jun. 6, 2003.

BACKGROUND OF THE INVENTION

The present invention relates to the integration of business applications in an integrated business solutions computing environment. More specifically, the present invention relates to maintaining the order of messages and documents when processed or transformed by an enterprise server.

The current business environment is very different from what it was just a few years ago. Today's organizations embrace the global marketplace, and this dictates a need to be able to efficiently operate at all times. Customers are now more sophisticated which translates into an accelerated pace of business and decision-making processes. Further, business relationships have become highly dynamic, and customers expect businesses to adapt quickly.

Technical and operational challenges abound as well. There is a need to support multiple applications on a variety of platforms, and to integrate with companies using the Internet, extranets, business to business (B2B) exchanges, and other resources. Also, to effectively compete in today's market, there is a need to build new solutions on "Internet time," utilizing open Internet standards and technology to assure maximum interoperability.

Businesses have typically used a variety of mechanisms to control and analyze business operations such as accounting, payroll, human resources, employee tracking, customer relations tracking, etc. Tools which provide these functions are often implemented using computer software. For example, a software package may manage business accounting, another software package might be responsible for receiving new orders, yet another software package will track warehouse inventory and still another package may handle order fulfillment and shipment. In another example, a business software package operated by one business will need to exchange data with a software package operated by another business to allow a business-to-business transaction to occur.

When business tools are implemented in software, it is not unusual for proprietary software packages to be responsible for each individual business task. However, this implementation is cumbersome and requires the same data to be entered in differing formats among the various business applications. In order to improve efficiency, integration applications have been developed which are used to integrate various elements of one business application with elements of another business application.

For example, if a software package, which is used to obtain new orders, includes data fields (or "entities") referred to as CustomerNameLast and CustomerNameFirst, it is a relatively straightforward process to map those entries to an accounting software program having the data fields BillingAddressFirst and BillingAddressLast. In such an integration system, the relationship between entities in one system (i.e., computer system or application) and entities in another system can be stored in tables. A system administrator can configure entity mapping between the systems by selecting between the various entities of the two systems.

When an integration system actually executes the transaction between the source application and the destination application as defined by the mapping process, several steps occur. First the source application creates a document or message, which contains data stored as entities, and transmits or publishes that document or message to the integration application. The integration application transforms the document or message according to the transformation processes defined during the mapping. Then the integration application posts the transformed message to the destination application.

Historically, in integration systems, entities in one business application have been linked to entities in a second business application by requiring each system to maintain a special field to store the unique identifiers of the other business application. This approach to maintaining and managing relationships between applications presents many problems. First the developer of the application needs the foresight to anticipate every possible field characteristic that can appear in another application program. Second this additional field restricts the number of associated entities for each entity to one. Third this approach requires the application to have additional logic programmed in to allow the retrieval of that record by that identifier.

SUMMARY OF THE INVENTION

The present invention includes a linking system that assists in managing the linking of entities contained in messages between two business applications. The linking system of the present invention also assists in the updating of entities between two business applications when an entity is updated in one application.

Messages are picked up by a receive function from a message queue and processed by a preprocessor. While the message is in the preprocessor, the message is processed to identify various features of the message necessary to post the message to the destination system. Once the preprocessing is finished the message is returned to the receive function.

The message is then passed from the receive function to the channels, and processed through channels in the integration server. The channels transform the message according to a predefined process. This process transforms the message from a format that is useable by the source system to a format that is useable by the destination system. Once the message is transformed it is delivered to a pipeline.

When the message reaches the pipeline the message is posted to the destination system. Following a successful posting of the message, the pipeline receives a confirmation back that the post was successful. Contained in this confirmation are associated parameters related to the entities created in the destination system. The pipeline then invokes a linker to establish links between related entities in source and destination application programs in a link table. The linker includes several protocols that manage the entry of entities in the link tables. Using the protocols contained in linker, the linker takes information from both application programs and creates two records in a first table and one record in a second table that represents the links between the two records based upon their entries in the first table. The linker establishes these links in the table by calling on modules contained in the linker.

Another feature of the present invention is a linker that includes a series of meta data tables that store information about the two systems or multiple systems that have information that is being integrated. The linker records for each entity in each system being integrated with entities in other system. It also includes several modules or APIs which allow for manipulation of the data and records stored in the tables.

These modules includes a module for inserting links and entities into the tables, a module for removing links in the tables, a module for removing an entity and associated links from the tables, a module for bulk loading entities and links into the tables, and a module for reporting the entities that are linked in the tables.

DETAILED DESCRIPTION OF ILLUSTRATIVE EMBODIMENTS

The present invention deals with managing messaging systems. However, prior to discussing the invention in greater detail, one embodiment of an environment in which the invention can be used will be discussed.

Figure 1:
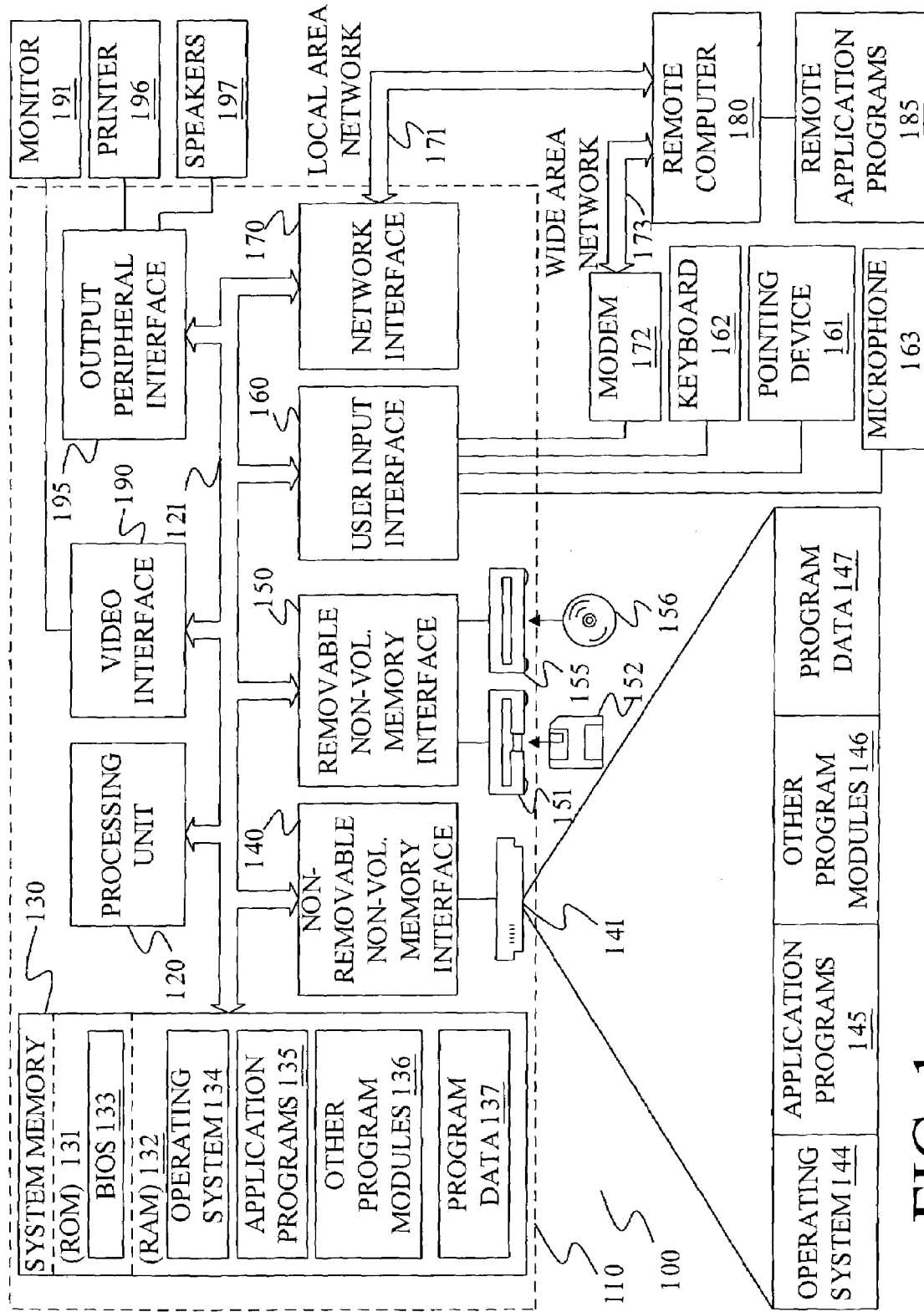
FIG. 1 is a block diagram of one exemplary environment in which the present invention can be used.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
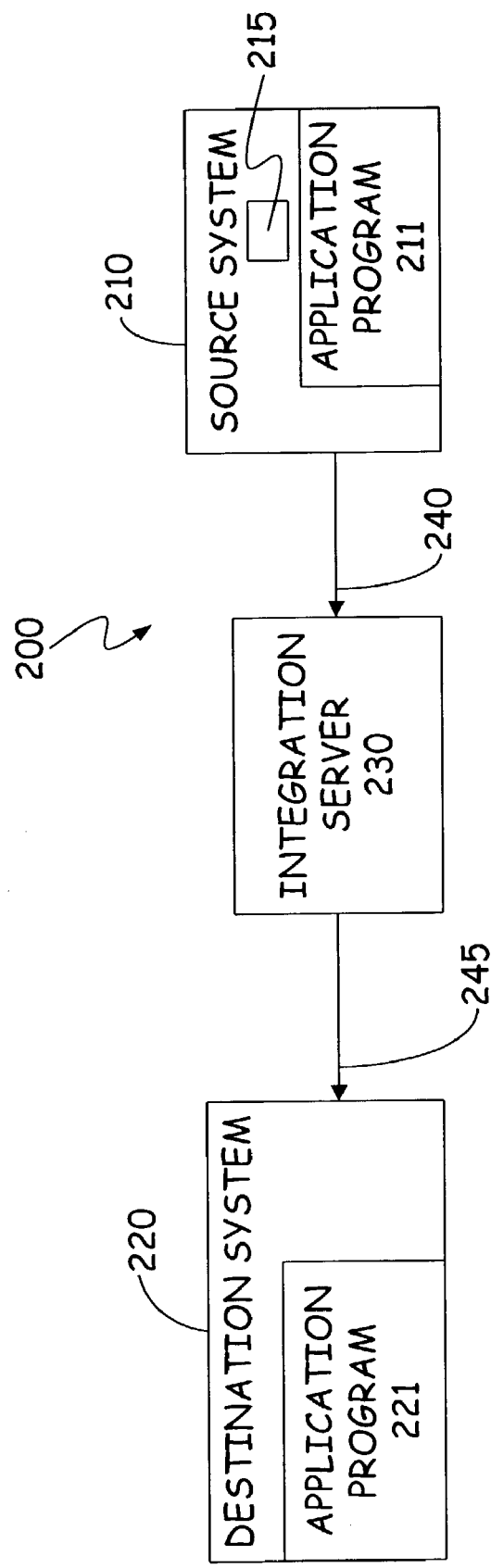
FIG. 2 is a block diagram illustrating an exemplary network environment in which the present invention can be implemented.

FIG. 2 is a block diagram illustrating a network environment in which the present invention can be implemented. Network 200 includes a source system 210, a destination system 220, an integration server 230, and document transports 240 and 245. Source system 210 is, in one embodiment, a computer, such as computer 110 or another system having an application program 211 that produces documents or messages 215. System 210 can be remote from or local to integration server 230. Similarly, system 220 can be a computer having an application program 221 that can receive documents or messages 215. Documents and messages are transported to and from integration server 230 via transports 240 and 245. Transports 240 and 245 can include hypertext transfer protocol (HTTP), secure hypertext transfer protocol (HTTPS), simple mail transport protocol (SMTP), Microsoft Message Queue (MSMQ) or other known transport protocols. Of course, the transports can be bidirectional but are simply shown in a context in which system 210 is the source and system 220 is the destination, by way of example.

Application program 211 produces a document or message 215, such as a sales order which is needed by application program 221. Messages are illustratively documents that have additional information attached to them, such as headers or footers which produce information regarding the information contained in the document. However, because application program 211 and application program 221 reside on different computers, and may use different formats or structures for data in a document, the document 215 must be transformed or altered so that application program 221 can read and understand the incoming document.

Integration server 230 provides this functionality by converting or transforming the format of the document 215 from application program 211 to the format of application program 221. Integration server 230 can be a computer (such as computer 110 in FIG. 1), a network server or any other information processing system. It should be noted that while only one integration server 230 is illustrated, systems 210 and 220 can be connected through multiple servers 230. Further, messages 215 can be passed through multiple servers 230 to reach the destination system 220.

Figure 3:
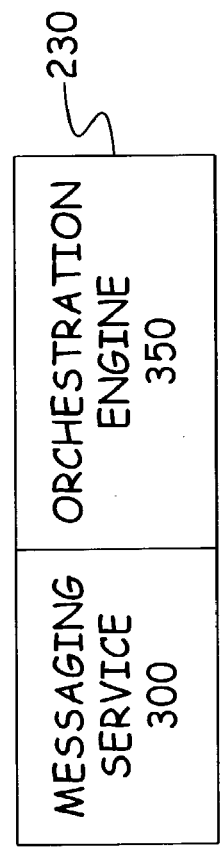
FIG. 3 is a block diagram illustrating two components of the integration server illustrated in FIG. 2.

FIG. 3 is a high level illustration of two components of the integration server 230 of FIG. 2. In one embodiment integration sever 230 is the BIZTALK Server from Microsoft Corporation of Redmond Wash. However, the integration sever 230 can be any other business to business (B2B) server or B2B integration control component or any component for messaging between two systems. The integration server 230 includes two separate individual server components, a messaging service 300 and an orchestration engine 350. However, other components can be included in server 230.

The orchestration engine 350 is, in one embodiment a COM+ application that manages complex distributed processes that require multiple decisions, loops and actions, such as, for example, processing an insurance policy application. The orchestration engine 350 is a simplistic graphical means of expressing a business workflow to assist in instructing the integration server 230 in learning how to transfer a document 215 from the format of application program 211 to the format of application program 221. The orchestration engine 350 assists a developer in creating workflow diagrams, or orchestration schedules, through the use of an orchestration designer to visually define and build the business process necessary to convert the formats.

Figure 4:
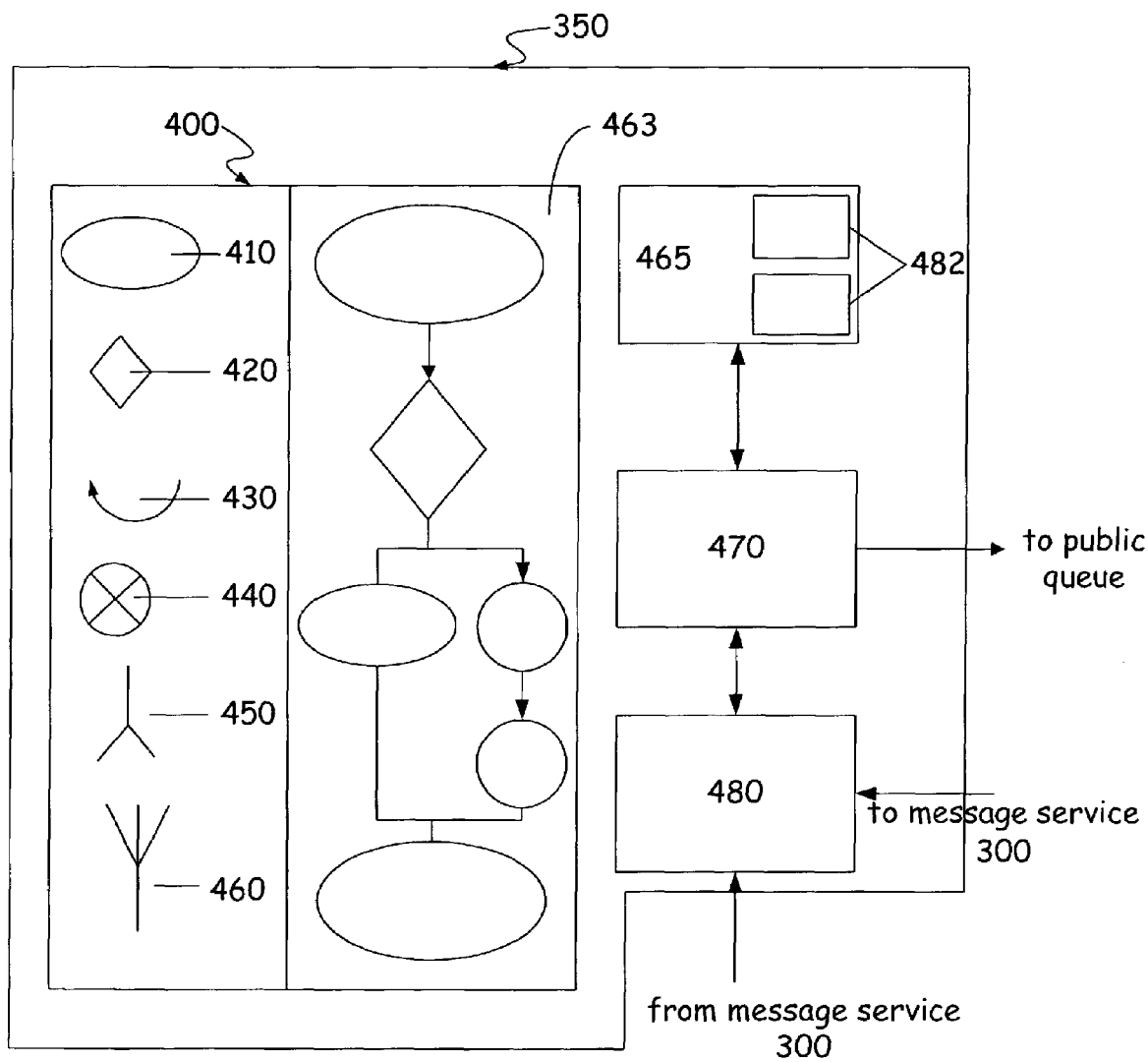
FIG. 4 is a block diagram illustrating the components of the orchestration engine illustrated in FIG. 3.

FIG. 4 is a block diagram illustrating the components of the orchestration engine 350. The orchestration designer 400 is a tool that facilitates the modeling process. One illustrative embodiment leverages existing graphical design software (such as VISIO 2000 also by Microsoft Corporation or any other graphical design component) to provide a graphical user interface (GUI) to assist the developer in developing a process model for the transformation. The process flow is graphically displayed to the developer as a flow chart 463. The orchestration designer 400 includes process options such as action 410, decision 420, while 430, abort 440, fork 450 and join 460. However, additional or different process options can be included in orchestration designer 400. Each of these process options allows for a different flow routine to be executed. For purposes of clarity and completeness a brief description of some illustrative examples of these process options is provided below for the sake of discussion.

The action process option 410 defines a process that typically requires information to be manipulated. For example, it might be an action step that runs the information through a filter, or it might be an action step that reformats data being processed.

The decision process option 420 defines a process where a yes/no, data query, or other information analysis is conducted, and the result determines which branch to follow to continue with the workflow. It may be determined that if a field is blank to have a branch that enables an action to fill the field with data. However, if the field is not blank, then a branch would allow the process to continue.

The while object process option 430 allows a process to loop until a specific event occurs. This might be a process that continues until the end of a dataset is reached, or it might be a process that continues until a specific data record is reached, for example. A branch can then be followed to a subsequent decision or action.

The abort object process option 440 identifies a step where the process needs to be terminated. In many cases, the abort 440 becomes a fail-safe test that determines that the information received is malformed, signaling data corruption in the transmission or just that incorrect data was transmitted. This step can provide a way to stop a process from continuing with incorrect information The fork process option 450 splits a process to conduct simultaneous tasks that can then be joined later through the join process option 460. This can, for example, be a process that enables information to be gathered for decisions to be made. For example, a fork in a process can be created to gather price and availability information from multiple vendors. This information can be gathered and processed simultaneously. From this fork, when the information has been analyzed, the system can join back together to continue with the process.

These process options are then linked to each other to generate a flow chart 463 or flow process for the desired process. The flow chart 463 is then compiled into a drawing 465. This "drawing" is referred to as an XLANG scheduling drawing 465. The XLANG scheduling drawing 465 is a version of flow chart 463 compiled into XLANG. XLANG is an XML based workflow definition language and is but one example of a definition language that can drive the orchestration engine 350.

Once the flow chart 463 has been converted into XLANG (or other definition language) it is passed to the XLANG scheduler engine 470. The XLANG scheduler engine 470 controls the activation, execution, dehydration, and rehydration of an XLANG schedule 465. This process takes the final designed business and technical process and puts it into a format that can be executed by the integration server 230.

The XLANG schedule 465 defines the steps to be performed, the components that must be called, and the data that will pass through the integration server 230 in order to complete the process generated by the orchestration designer 350. When documents or messages 215 are sent from the XLANG schedule 465 to the messaging service 300, the name of a channel that will receive the documents is defined. After the channel is defined, documents can pass from the messaging service 300 to an orchestration service 480 through the channel.

In the orchestration service 480, the document 215 is either processed in XML format for instance, or if the document is not in XML, the XLANG scheduler engine 470 can embed the document 215 in the engine's 470 standard XML wrapper. However, other internal language formats can be used. When inside the XLANG scheduler 470, the document 215 can undergo any modifications defined by the process. After processing the document 215, it can then be sent back to messaging service 300 for posting to a destination, or it can be sent out of the XLANG scheduler 470 to a private or public queue.

The XLANG scheduler engine 470 employs two processes to prevent scaling problems caused by multiple XLANG schedules running in parallel over extended periods of time. These two processes are referred to as dehydration and rehydration. Dehydration involves taking a schedule 465 that is not immediately required and writing the status of the schedule to a status database. As the schedule 465 is not being processed at that time, more resources are freed. Rehydration involves reloading the schedule 465 into the main memory of the server with the same status the schedule 465 had at the time of dehydration.

The orchestration service 480 includes ports 482, which are named locations in the XLANG schedule 465. The port 482 implements a technology, such as COM, MSMQ, or the messaging service, in order to send or receive messages. However, other technologies can be implemented as well. The port 482 can implement communications either synchronously or asynchronously, and is used to send messages or documents 215 to, or receive messages from the XLANG schedule 465. Orchestration ports 482 differ from messaging ports used in the messaging service 300. Messaging ports will be described in greater detail in FIG. 5.

Figure 5:
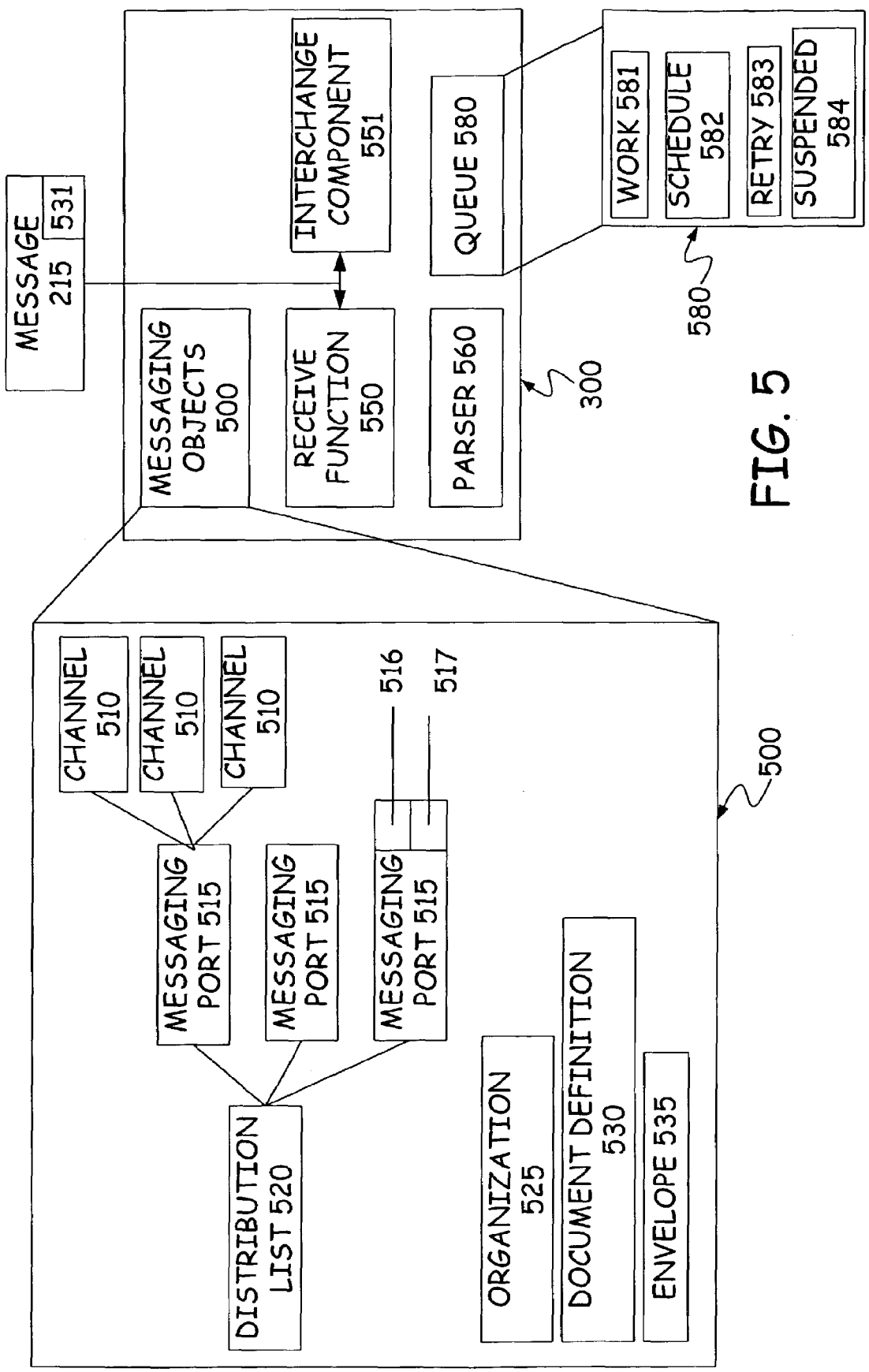
FIG. 5. is a block diagram illustrating the components of the messaging service illustrated in FIG. 3.

FIG. 5 is a block diagram illustrating the components of messaging service 300 in FIG. 3. Messaging service 300 includes messaging objects 500, receive functions 550, and parsers 560. However, other components can be included in the messaging service 300 such as interchange component 551 and queue 580. Messaging services 300 are a component in the integration server 230 that enable the sending, receiving, parsing, and tracking of messages and documents 215 from outside organizations or from applications, such as application programs 211 and 221 in FIG. 2. In addition, messaging services 300 include the ability to generate receipts for certain file formats, correlate and map data, verify the integrity of documents, and provide secure methods for exchanging documents with outside sources and applications.

Messaging objects 500, receive functions 550, component object models (COM) and COM+ methods, parsers 560, and SQL server databases (such as, for example, Microsoft SQL Server version 7.0 with SP2), can be used to implement the messaging services 300. Messaging objects 500 are used to configure the necessary properties to process and transmit documents submitted to the integration server 230. Receive functions 550, and in some instances other methods, are used to submit incoming documents or messages 215 to the integration server 230 for processing. Once a document or messages 215 is submitted, the appropriate parser 560 parses the document and, if necessary, converts the document to another format (such as an XML format). Finally a tracking database 561 stores document records for both incoming and outgoing documents 215 that are processed by the integration server 230.

Messaging objects 500 include channels 510, messaging ports 515, distribution lists 520, organizations 525, document definitions 530, and envelopes 535. However, other components can also be included. The integration server 230 uses these objects 500 to configure the necessary properties to process and transmit submitted documents 215 or messages. For purposes of this discussion the terms documents and messages are used interchangeably for data that is submitted to the integration server 230 for processing. The primary difference between documents and messages is that messages contain additional information such as headers and footers that are not present in documents.

Channel 510 is a named entity that is used as a reception gateway for documents and messages from either a previously known originating organization or from an open messaging source. An open messaging source is a generic channel that is configured to identify the origin of the message from the content of the message. In one embodiment, channel 510 is bound to a single messaging port 515. Whereas, a messaging port 515 can have an unlimited number of channels 510 assigned to it.

A channel 510 includes a set of properties, which identifies the source organization or application that has sent out the document or message. The channel 510 also defines the specific steps that are performed by the integration server 230 before the document is delivered to the associated messaging port 515. The channel properties can include a source organization or application, a document definition, a transformation map, field and document tracking settings, and archiving information. Only properly formatted and verifiable data is sent through channel 510. In order to ensure this, the channel 510 defines the format in which it expects to receive messages, and also defines how this data will be forwarded through to the associated messaging port 515. Both the inbound and outbound document definitions are references to document specifications that are expressed in a format that is understandable by the integration server 230. When a document 215 is submitted to the channel 510, it is verified against the inbound specification. If the document is not compatible with the required format for the channel 510, the data is rejected and the message is placed in a suspended queue. The queues 580 will be discussed in greater detail below.

When a document 215 is in the channel 510 the document 215 can illustratively be altered in two ways by transformation or translation. The document 215 is altered such that the definition of the document, and the data between records and fields for the source document specification, and the records and fields for destination document specification are correlated. This process of correlating information from one input format to another goes through one of two different processes. The integration server 230 can alter the schema of the information in a process that is said to transform the information (or be a transformation), or the integration server 230 can actually alter the data itself in a process that is said to be a translation of the information.

In one embodiment, the transformation process used by the integration server 230 is handled by script coding using functoids. A functoid is a reusable function built-in to the orchestration service engine 480 that enables simple as well as complex structural manipulation between source and destination specifications. A transformation of information is common because input and output formats frequently do not match, and need to be altered so that fields from one format match the fields of the other format during the transformation process. The translation process, although by definition alters the data in the document 215, does not necessarily delete the information and replace it with completely different data, but instead the information may be analyzed and modified for a new or different format. For example, data translation can replace a "State" definition such as "Calif" with a standard two-letter "CA" postal format. This transformation of the documents occurs in the channel 510 as the document 215 is passed through the messaging service 300.

Messaging ports 515 are a set of properties that specify how a message or document 215 is transported to a destination organization or application. Messaging port properties can include transport services, destination organization or application, security settings, and envelope settings.

Each messaging port 515 has a primary transport 516 and an optional backup transport 517. These transports 516 and 517 are used for binding communications endpoints that link to a remote organization or to an application. The messaging ports 515 provide a map between an abstract addressing scheme of organization identifiers and transport dependent addresses through channels 510. Hence, a multitude of messaging ports 515 can exist for a single destination organization or application.

The primary and back-up transports 516 and 517 are push services that use transport protocols supported by integration server 230 to deliver documents or messages 215 to the destination application. These transport protocols can include hypertext transfer protocol (HTTP), secure hypertext transfer protocol (HTTPS), simple mail transport protocol (SMTP), Microsoft Message Queue (MSMQ) or other transport protocols. Further, special transport protocols can be used such as Application Integration Components (AIC), which allow documents and messages 215 to be submitted directly, or to be carried over proprietary protocols.

When a document 215 is sent to the destination application 221 identified by the messaging port 515, the integration server 230 uses the primary transport 516. The back-up transport 517 is used only when there is a transport level error, such as an unreachable or crashed server when multiple servers are used. Therefore, the primary and back-up transports 516 and 517 generally use the same application protocols, but point to different channels 515 to increase robustness of the system.

Distribution lists 520 are a group of messaging ports 515. Distribution lists 520 are used to send the same document 215 to more than one organization or application. The distribution list 520 is sometimes referred to as a port group.

Organizations 525 are trading partners or other entities with whom the integration server 230 exchanges messages and documents. These organizations can be internal to the server, such as an application or division within the host organization, or can be external to the server, such as an external business or an application at that external business.

Document definitions 530 are a set of properties that represents an inbound or an outbound document 215. The document definition 530 can include a property that provides a pointer to a document specification. A document specification 531 defines the document structure, document type, and version. However, a pointer from the document definition 530 to the document specification 531 is not required.

One or more documents 215 can be packaged together as an interchange, which is submitted to the integration server 230. The interchange can be a single document along with header and footer information. However, the interchange can also involve multiple documents having header and footer information. As headers and footers are used in the interchange, the messaging service 300 needs to be able to identify where in the interchange the document begins and ends. Depending on the file format the messaging service 300 will need to know how the header and footer information is structured, and hence where the document 215 is found in the interchange. The messaging service 300 receives this information through the use of envelopes 535.

Envelopes 535 are a set of properties that represent the transport information for a document. The envelope 535 wraps data for transport and selects the destination of the data. Envelopes 535 include headers for messages and function groups. However, other types of headers can be included in the envelope 535. In one embodiment, the messaging service 300 uses six types of envelopes 535. These are X12, EDI-FACT, Flat-File, Custom, Reliable, and CustomXML. However, other or additional types of envelopes can be used. The type of envelope 535 used to wrap the document 215 tells the messaging service 300 which parser 560 should be used to process the incoming document. An envelope 535 associated with an inbound message or document provides the integration server 230 with the information that the server needs to interpret the submitted document. For example, the envelope 535 can include a pointer to a document definition 530. Envelopes 535 associated with an outbound message or document give an outside server the information it needs to create the document.

Inbound messages do not necessarily require an envelope 535 to accompany the document 215. Envelopes 535 are required only for documents that are submitted to the messaging service 300 that are in a format that the messaging service 300 cannot able to readily recognize. However, for outbound documents messages an envelope 535 may be required. The envelope 535 is created during the configuration of the outbound messaging port 515. This allows the messaging service 300, through a serializer, to build a complete outgoing message including the header and footer information, so that when the document 215 is submitted to another messaging service it is able to identify the type of documents being submitted, regardless of the internal format used by the destination server.

Message and documents are submitted into the integration server 230 through an interchange component 551 or a receive function 550. The interchange component 551 is configured to support transactions. As a result, the interchange component 551 adopts the characteristics of the application that is invoking the interchange component 551. Once a message or document is submitted, the interchange component 551 selects the appropriate parser 560 in integration server 230 based on information in the envelope 535 to parse the message or document, unless the message or document is submitted with a pass-through flag enabled. The parser 560 converts the document 215 contained in the message from its native format to a format that is understandable by the messaging service of the server. In one example, if the integration server 230 is configured to operate in an XML format, the parser does not parse documents that are submitted in XML. The integration server 230 also does not parse messages and documents submitted with the pass-through flag enabled, but passes the document on to the destination in the format it was submitted.

Receive functions 550 are components of the integration server 230 that monitor either a message queue 580 or a directory in a file system directory. When a message arrives in the queue 580 or a file is placed in the directory, the receive function 550 takes the file or message and submits it directly for processing by the messaging service 300. File receive functions watch a certain directory identified on the logical drive or on a universal naming convention (UNC) file path. The file receive function continuously monitors the identified directory for files that have specified file extensions, and when files having these extensions arrive, the file receive function submits the associated document for processing. Message queue receive functions monitor queues in the shared queue database 580 and submits arriving items into the queue for processing.

When a message or document 215 is submitted to the integration server 230, the document or message 215 is stored in a shared queue database 580 until it is picked up for processing. The shared queue 580 includes four separate queues, a work queue 581, a scheduled queue 582, a retry queue 583, and a suspended queue 584. By accessing these queues 580, it is possible to determine what stage of processing a message or document 215 is in. For example, it is possible to determine if a document has been processed and is waiting for transmission or if the message or document failed processing. Messages and documents 215 appear in each of the queues in the order of "first in, first out." That is, the oldest items in the work, retry, scheduled, or suspended queue appear first and the newest items appear last.

The work queue 581 holds all messages and documents that have been submitted to the integration server 230 for asynchronous processing, but have not been picked up by the receive function 550. If messaging processing is synchronous, the work queue 581 is not used and the document is processed immediately. The work queue 581 contains messages and documents 215 that are currently waiting to process. Messages and documents placed in the work queue 581 are processed upon arrival, and therefore do not remain in the work queue for long periods of time.

The receive function 550 polls the work queue 581 at predetermined time intervals to pickup the next documents in the work queue 581 for processing. These documents are picked up by the receive function 550 as batches of documents or messages. The rate of release of documents in the work queue 581 depends on the configuration of the integration server 230. Any message in the work queue 581 can be moved to the suspended queue 584. Once a message or document is moved to the suspended queue 584, it can be deleted, resubmitted, or retransmitted to the work queue 581 to complete processing at a later time.

When a message or document is processed, a channel 510 and a message port 515 are associated with the message. The message port definitions can include a service window for processing the message. For example, the service window could be defined as between Midnight and 1:00 am. If the message is processed outside this service window the message is redirected to the scheduled queue 582. The scheduled queue 582 contains messages and documents that have been processed by the integration server 230 and are waiting for transmission based on the service window. The scheduled queue 582 holds the message until the service window opens. Once the service window is opened the message service 300 attempts to resend the message through the previously identified message port 515. Like the work queue 581, any item in the scheduled queue 582 can be moved to the suspended queue 584.

If a message fails to send or post due to a communications error or for other reasons the message is placed in the retry queue 583. The retry queue 583 contains messages and documents 215 that are to be resubmitted for delivery and documents that are waiting for reliable messaging receipts. A message can be sent to the retry queue 583 if during processing a receipt was expected, but was not present. When a receipt is required, a message can remain in the retry queue 583 until the receipt is received, or it can be treated like all other messages in the retry queue 583 and automatically resent. The message will continue to be resent according to the frequency and number of attempts configured by the channel 510. If the number of attempts to resend the message exceeds a threshold or the document's time to live (TTL) is exceeded, the message 215 is moved to the suspended queue 584.

The suspended queue 584 stores and displays messages and documents 215 that have failed processing, or that have failed to post to their destination. Messages can fail because some fatal unrecoverable error occurred in processing. For example, these errors can include parsing errors, serialization errors, and missing channels. Messages in the suspended queue 584 have an associated error report that indicates why the message was placed in the suspended queue 584. Depending on the nature of the failure most messages or documents in the suspended queue 584 can be deleted, resubmitted, or retransmitted to the server 230 for processing. However, in one embodiment, some messages and documents cannot be resubmitted, for example, messages that failed parsing cannot be resubmitted or retransmitted.

The integration server 230 takes documents 215 from the queues 580 in batches for processing and transformation through the receive function 550. However, once documents are taken from the queues 580 in batches, any order that may have existed in the documents is lost. It is only by chance that documents and messages 215 are processed in the correct order. To help ensure that documents 215 are posted in the correct order, the integration server 230 also includes a document messaging state management engine that assists in posting a document from a first application program 211 to a second application program 221 in an order that is sequentially correct for the second application program 221. The document messaging state management engine is illustratively a component module of the messaging service 300.

Figure 6:
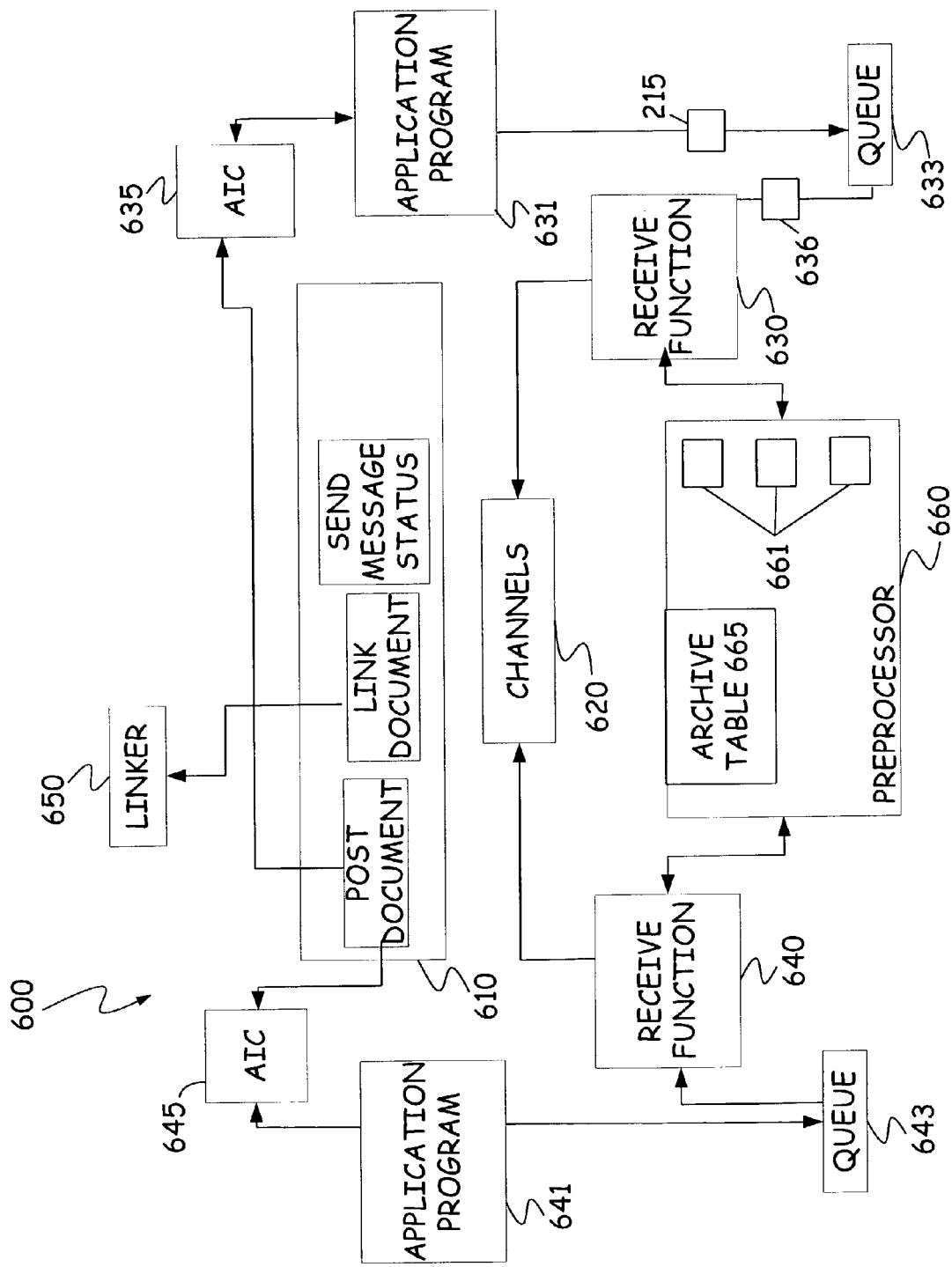
FIG. 6 shows a block diagram illustrating a messaging service including a linker.

FIG. 6 illustrates a messaging service 600 including the linking system of the present invention. Messaging service 600 includes a pipeline 610, channel 620, a first application receive function 630, a second application receive function 640, a first application or source application integration component (AIC) 635, a second application or source destination AIC 645, a first application queue 633, a second application queue 643, a preprocessor 660 and a linker 650. The components of linker 650 are illustrated in greater detail in FIG. 8. The messaging service 600 is connected to a first application program 631 and a second application program 641.

Figure 7:
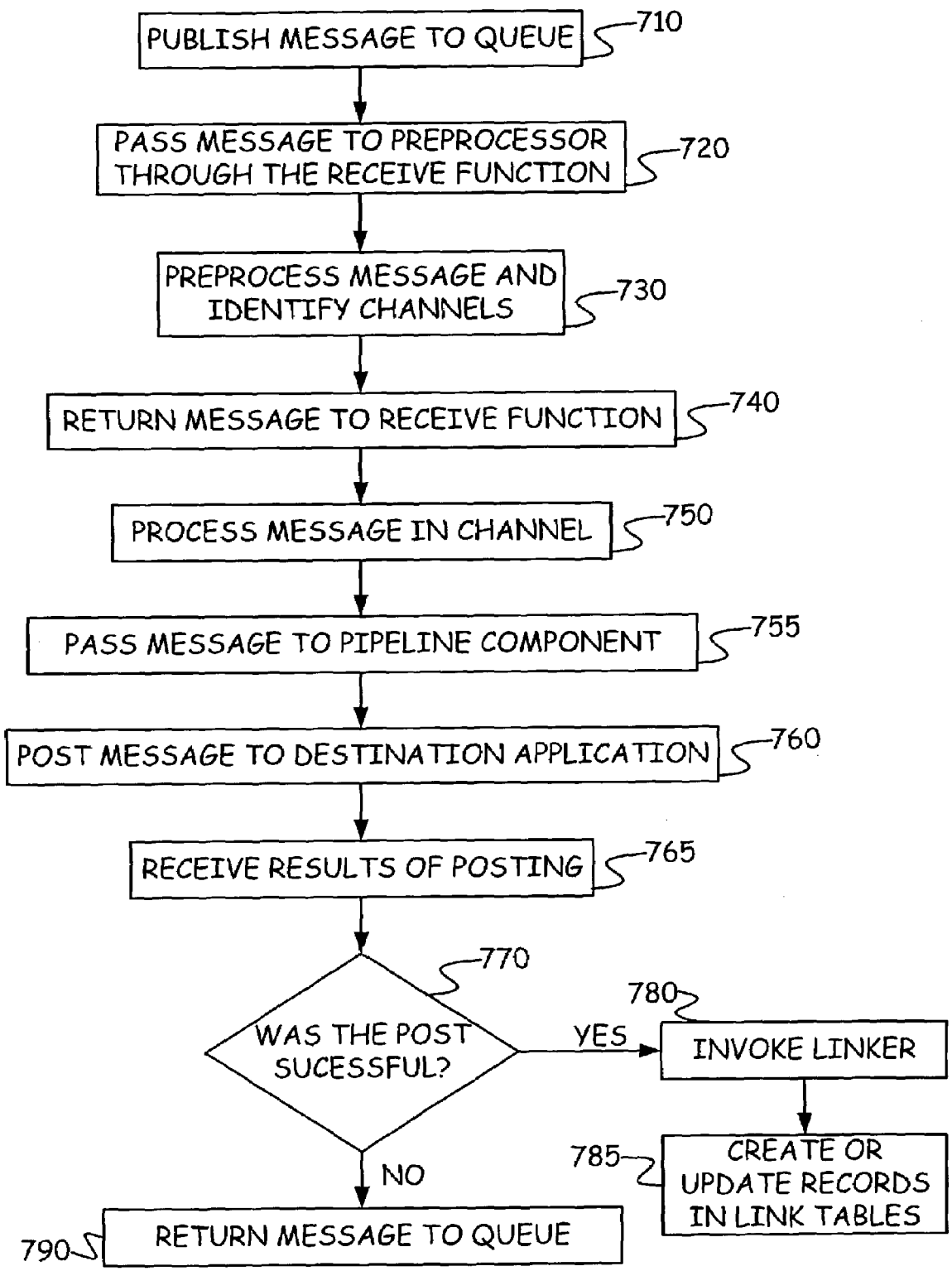
FIG. 7 is a flow chart illustrating the basic steps that are executed by the messaging service when a message is published to the messaging service.

FIG. 7 is a flow diagram illustrating the basic steps that are executed by the messaging service 600 when a message is published to the messaging service 600. FIGS. 6 and 7 will be described together and references made to each drawing.

The first application program 631 publishes a message 215 to messaging service 600. The messaging service 600 receives the message 215 and places the message 215 in the work queue of the queues 633. Depending on the characteristics of the message 215, the message 215 can be placed in other queues in the queue 633. The publishing of the message 215 from first application program 631 to the queue 633 is illustrated at block 710.

When the message 215 is placed in one of the queues 633 the receive function 630 pulls the message 215 from the associated queue 633 as one of many messages in a batch 636. The receive function 630 then passes each message 215 in the batch 636 to preprocessor 660. This passing of the message to the preprocessor is illustrated at block 720.

At block 730, preprocessor 660 proceeds to preprocess each message 215 provided by the receive function 630. Preprocessor 660 analyzes the contents of each message including any header and footer information contained in the message, and determines which channel 610 and messaging ports are needed for message 215 to post to the destination application program 641. While the message is in preprocessor 660 other transformations can occur. For example, the messaging service 600 can included a state management system, such as the state management system disclosed in application Ser. No. 10/402,337, in order to maintain correct message ordering and posting priorities. These additional procedures can be performed while the message 215 is in the preprocessor 660.

Also, while the message is in the preprocessor 660, preprocessor 660 can make changes to the message's header and footer so that it is compatible with the format of the identified channels 610 of messaging service 600. Once the preprocessing is completed the preprocessor 660 passes the message 215 back to the receive function 630. The providing of the message 215 to the receive function 630 is illustrated at block 740.

Once the message 215 is returned to the receive function 630, the message 215 is then passed to one of the channels 620 identified by the preprocessor 660. When the message 215 is in the channel 620 the message can be transformed according to the method developed in the orchestration service of FIG. 3 where the XLANG schedule converts the message 215 from the source application's 631 format to the destination application's 641 format. During this transformation process a check for any required external links can be performed. If the link is not required to exist then this check is not performed. If a link is required to exist and the link does not exist the system 600 can send the message to one of the queues of queue 633. This step is illustrated at block 750 of FIG. 7.

After the channel 620 processes the messages 215, the message 215 is passed to the pipeline component 610 at block 755. The pipeline component 610 is an interface that receives an indication that the transformation and posting of a message or message 215 was successful. Once the message 215 is received by the pipeline 610, the transformed message 215 is then posted to the second application program 641. For example, if the message 215 was a create message to create a new entry in the destination application 641, the pipeline component 610 will post the create message and associated information to destination application program 641. This posting of the message 215 is illustrated at block 760.

Following the posting of the message 215 to the destination application program 641, the pipeline 610 receives from the destination application program 641 the results of the posting of the message at block 765. The results indicate if the post was successful. For example, in the above example of creating a new record in application program 641, the pipeline 610 waits for an indication that the post was successful. This is illustrated at block 770. If the results of the posting are unsuccessful the pipeline 610 would submit the message to the retry queue of queue 633 at block 790. If however the results of the posting are successful, the pipeline 610 invokes the linker 650 as illustrated by block 780.

When the linker 650 is invoked links between the related entities in both application programs 631 and 641 are established in a link table. Linker 650 includes several protocols that manage the entry of entities in the link tables. Using the protocols contained in linker 650, the linker 650 takes information from both application programs 631 and 641 and creates two records in a first table (one for each program) and one record in a second table that represents the links between the two records based upon their entries in the first table. These records tell the service 600 that the two records are linked together. The operation of modules and of the linker tables will be discussed in greater detail below. Also, depending on the nature of the message 215 when the linker 650 is invoked links can be removed from the link tables contained in linker 650. This establishment or removing of links illustrated at block 785 of FIG. 7.

Figure 8:
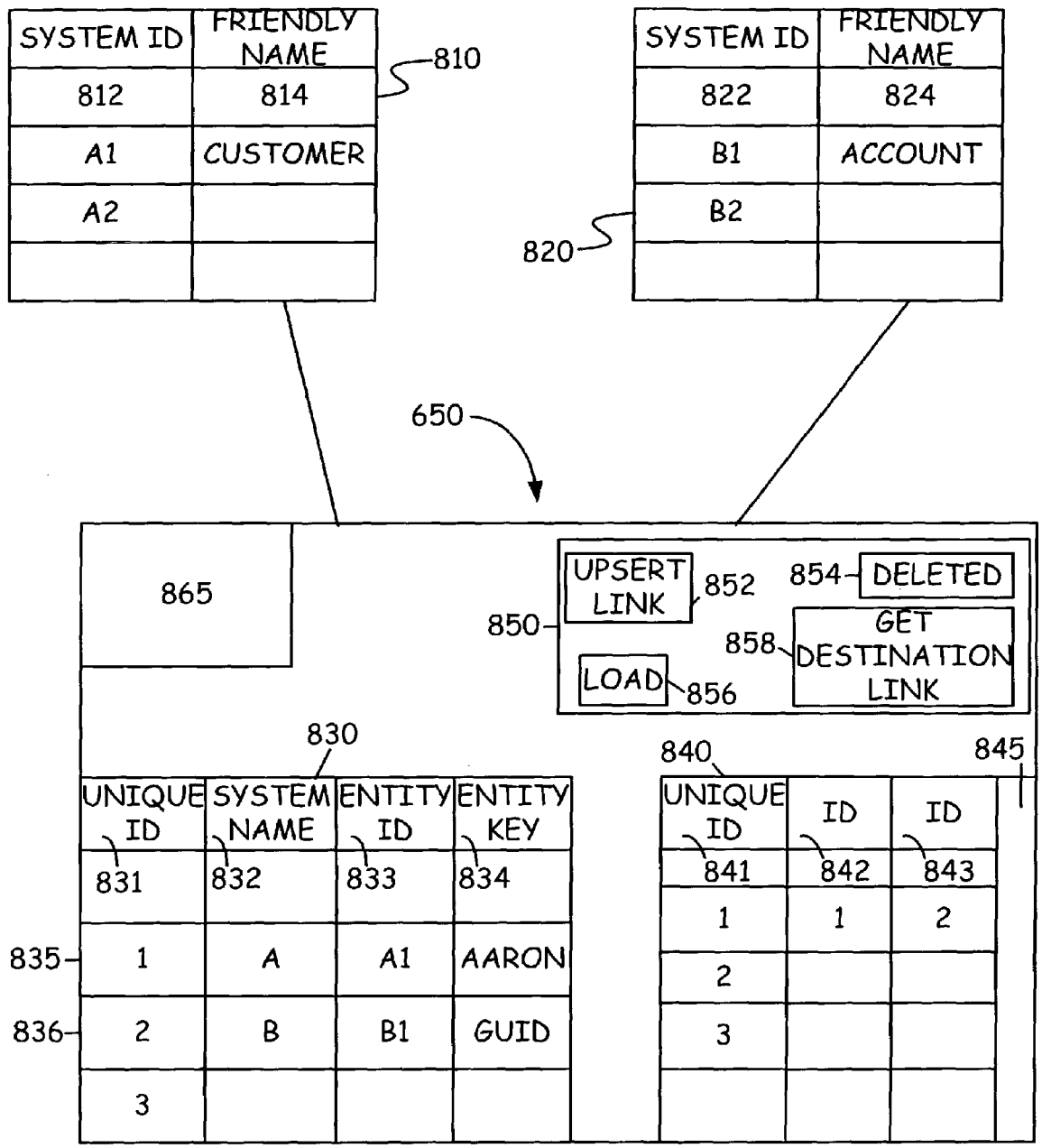
FIG. 8 is a flow chart illustrating the steps executed by the state management system when a document reaches the pipeline.

In the B2B environment there are often two separate business software applications that communicate to each other and integrate data with each other. It is desirable to know when data is moved from one system to another system whether the second system made any changes to that data that should be mapped back to the original or source system. However, commonly, these two separate systems are ignorant of the existence of the other system. The linker 650 provides a mapping framework between the two systems regardless of the system's knowledge of other systems. Linker 650 includes a series of meta data tables that store information about the two systems or multiple systems that have information that is being integrated. Linker 650 includes records for each entity in each system being integrated with entities in other system. FIG. 8 illustrates linker 650 in greater detail. Also illustrated in FIG. 8 are two exemplary systems 810 and 820 that are being linked or integrated with each other.

Linker 650 includes an integration entity instance table 830, an entity instance link table 840, a history or archive table 865 and APIs 850. Systems 810 and 820 include messages which are represented as entities. An entity is a message from a specific area of the system 810 or 820. For example, a back office entity could be inventory or customers. Each entity in system 810 and 820 is identified by a system id 812 or 822 and a "friendly name" 814 and 824. The "friendly name" 814 and 824 is a name that is easily understood by the user of the system 810 or 820. The system id 812 and 822 is a numerical identifier used by the systems 810 and 820 to identify the entity. In one embodiment this system id is a GUID.

Integration entity instance table 830 includes four columns. A unique id column 831, a system name column 832, an entity id column 833 and an entity key column 834. Unique id 831 is a unique internal id for each entity identified in systems 810 and 820. The system id in column 832 holds the system id identified by the linker 650 for the entity of either system 810 or 821. Entity id column 833 includes the unique id that identifies the entity to the source system 810 or 820. Entity key column 834 stores the value for the entity identified by the entity id 832. However, other entries can be used in instance table 830. The specific format of the entity key in the parent system does not matter as the instance table 830 stores the value of the entity key in its original format. This also holds true for the name given to the entity key by the destination system.

Entity instance link table 840 is a table that includes records or entities that are linked together. Link table 840 includes three entries, a unique id entry 841, a first entity id entry 842 and a second entity id entry 843. First id entry 842 is the unique id entry 831 from the integration entity table 830 for the first entity linked. Second id entry 843 is the unique id entry 831 from integration entity instance table 830 for the second entity linked. These two entries are identified in the entity instance link table 840 with the unique id 841.

History or archive table 865 is a table that includes entries and records in the integration entity instance table 830 that have been removed or deleted from table 830. History or archive table 860 contains the identical information for the entity entry in integration entity instance table 830.

Linker 650 includes several modules or APIs which allow for manipulation of the data and records stored in tables 830 and 840. These modules include an Upsertlink API module 852, a Deletelink API module 854, a GetDestinationLink API module 858 and a Load API module 856. The Upsertlink API 852 is a module called for placing or entering new entities into the integration entity instance table 830 and for creating new links in the entity instance link table 840. The Deletelink API 854 provides the linker 650 the ability to remove either a link record in the entity instance link table 840 and/or an entry from the integration entity instance table 830. The GetDestinationLink API 858 is a module that returns a collection of entities that are linked to a given system entity instance. The load API 856 is a bulk loading module for updating or creating the integration entity link table 840, and creating any instance records in the integration entity instance table 830 that does not exist. Each of these APIs will be discussed in further detail with reference to FIGS. 9-13.

Figure 9:
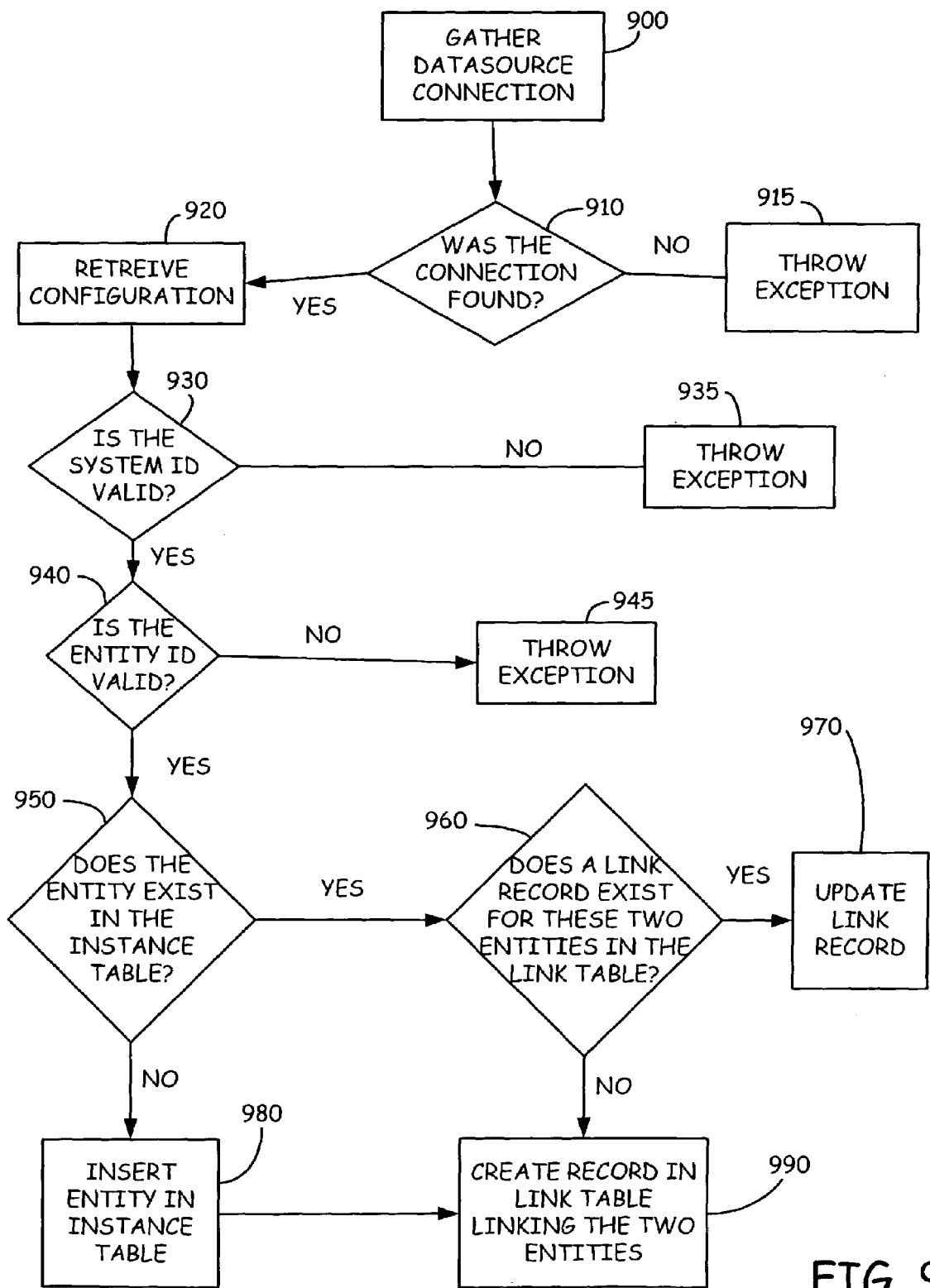
FIG. 9 is a flow chart illustrating the steps executed by the UpsertLink API.

FIG. 9 is a flow diagram illustrating the steps executed by the UpsertLink API. When linker 650 is invoked to create a link between two entities in two systems the linker 650 calls the UpsertLink API to create the necessary components in the linker tables 830 and 840. These parameters include the system ID's for both entities, the entity id's for both entities, and the entity keys for both entities.

When the UpsertLink API is called the program first gathers the datasource connection. During this step the UpsertLink API gathers the parameters for each of the entities in each of the systems that are to be linked. This gathering is illustrated at block 900. If the datasource connections cannot be found, for example, one of the requested entities does not exist in the system, the UpsertLink API will throw an exception to an error log. This step is illustrated at blocks 910 and 915.

If the datasource connections are found at block 910 the UpsertLink API retrieves the configuration information for each of the gathered entities. These configurations include linking characteristics of the two entities. This step is illustrated at block 920. Following the retrieval of the configurations the UpsertLink API checks to see if the system ID obtained for each entity is valid. A valid system ID can include a GUID that refers to a system that is currently in use by the messaging service 600. This step is illustrated at block 930. If the system ID is not valid the UpsertLink API throws an exception or an error at block 935. Next the UpsertLink API checks if the entity ID is valid. This is illustrated at block 940. However other Ids can be checked at blocks 930 and 940. If the entity ID is not valid the UpsertLink API throws and exception or an error at block 945. If an error is thrown by the UpsertLink API during the process of checking the system ID, the entity ID, or during the gathering of the datasource connections, the UpsertLink API stops all further processing of the entities, and makes no entry into the link tables 830 and 840.

Following the verification that the system IDs and the entity IDs are valid the UpsertLink API determines if each passed in entity already exists in the integration entity instance table 830. This check is illustrated at block 950. If the entity exists in the integration entity instance table 830 the UpsertLink API identifies the record for the entity, and determines if there are any links pre-existing for the identified record. This is illustrated at block 960. If a link is found for the passed in entity the UpsertLink API updates any records that have the same entity ID as the passed in entity. This is illustrated at block 970. If there is no preexisting link between the passed in entities the UpsertLink API creates a record for the entity in the entity instance linking table 840 by placing the unique ID 831 from table 830 for each entity in either column 841 or 842 of link table 840. This is illustrated at block 990. If the passed in entity does not exist in the integration entity instance table 830 the UpsertLink API inserts the entity into the table 830. In the table 830 the UpsertLink API creates an unique ID for the entity in column 831, enters the system ID for the entity in column 832, enters the entity ID in column 833, and enters the entity key in column 834. This is illustrated at block 980. Then the UpsertLink API creates a record for the entity in the entity instance linking table 840 by placing the unique ID 831 from table 830 for each entity in either column 841 or 842 of link table 840 at block 990.

An example of the process illustrated by FIG. 9 is described below. Assuming that the messaging service 600 is integrating a CRM program (system A) with a Back Office account management program (system B). For example, System A has an entity type of customer with an entity key of AARON, and System B has an entity type of account and an entity key of a GUID, where these two entities are to be linked. Once the UpsertLink API has verified that the system ID's and entity ID's for the entities are valid, the UpsertLink API determines if the entity of system A exists in the instance table 830. Assuming that this entity does not exist in instance table 830 the UpsertLink API generates a unique ID 831 for the entity and inserts the paramaters of the entity of system A into the instance table 830. This entry for the entity into the instance table 830 is illustrated at line 835 of FIG. 8. The UpsertLink API repeats this process for the entity of system B. This entry of the entity into the instance table 830 is illustrated by the entry on line 836 of FIG. 8. Following the entry of the two entities into the instance table 830 the UpsertLink API then creates an entry in link table 840 for the two entities. The entry for this link in table 840 is illustrated at line 845 of FIG. 8. As discussed above the entry in table 840 is the unique ID's 831 from table 830 for each entity. It should be noted that it does not matter to the linker 650 if the entry ID for system A is before or after the entry for system B.

Figure 10:
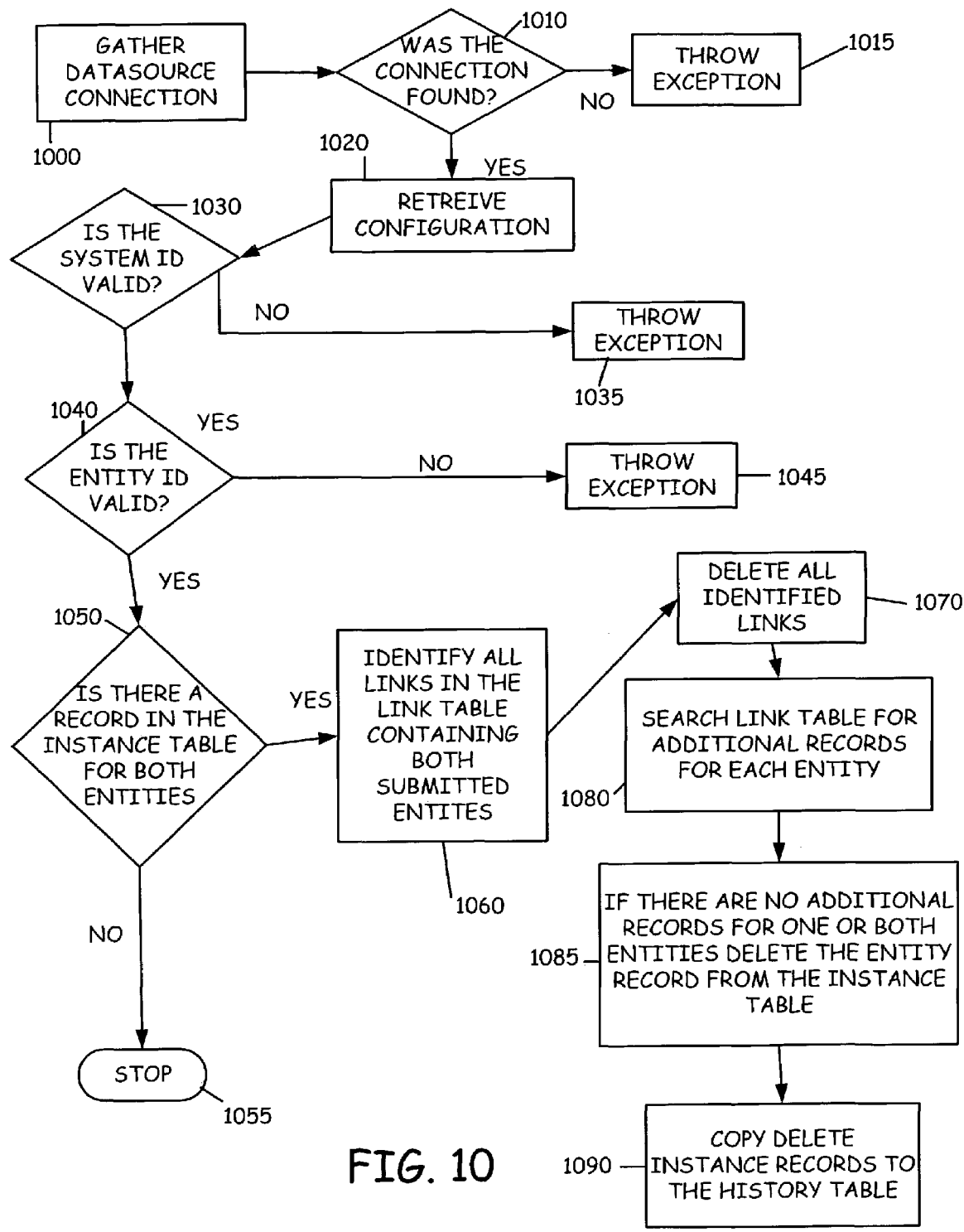
FIG. 10 is a flow chart illustrating the step performed by the linker when the Deletelink API is executed.

FIG. 10 is a flow diagram illustrating the steps performed by the linker 650 when the Deletelink API is executed. The Deletelink API is similar to UpsertLink API discussed in FIG. 9, except that the Deletelink API removes the links in link table 840, and can remove instance records form the instance table 830.

When the Deletelink API is called the program first gathers the datasource connection. During this step the Deletelink API gathers the parameters for the entities from each of the systems having entities that are to be linked. This step is illustrated at block 1000. If the datasource connections cannot be found, for example, one of the requested entities does not exist in the system, the Deletelink API will throw an exception to an error log. This step is illustrated at blocks 1010 and 1015.

If the datasource connections are found at block 1010, the Deletelink API retrieves the configuration information for each of the gathered entities. These configurations include the linking characteristics of the two entities. This step is illustrated at block 1020. Following the retrieval of the configurations the Deletelink API checks to see if the system ID obtained for the entity is valid. A valid system ID can include a GUID that refers to a system that is currently in use by the messaging service 600. This step is illustrated at block 1030. If the system ID is not valid the Deletelink API throws an exception or an error at block 1035. Next the Deletelink API checks if the entity ID is valid. This step is illustrated at block 1040. Once again other IDs can be checked at blocks 1030 and 1040. If the entity ID is not valid the Deletelink API throws and exception or an error at block 1045. If an error is thrown by the Deletelink API during the process of checking ID's or during the gathering of the datasource connections the Deletelink API stops all further processing of the entities, and does not proceed to remove the link for the link table 840.

Following the verification of the system ID and the entity ID the Deletelink API determines if there is an integration entity instance record in the instance table 830 for each entity. This step is illustrated at block 1050. If no matching record is found in the integration entity instance table Deletelink API stops any further processing. This is illustrated at block 1055.

If the record is found the Deletelink API identifies all of the links in link table 840 having the unique ID 831 of the instance table 830 for the submitted entities. This step is illustrated at block 1060. The Deletelink API then deletes each entry in the link table 840 for each record in the table 840 that matches the submitted entities. This deletion is illustrated at block 1070. Following the deletion of the links in the link table 840, the Deletelink API then searches the link table 840 for each entity submitted, and checks if each of the submitted entities is linked to another entity (i.e. does the entity appear in another record separate from the submitted entities), at block 1080. If one of the submitted entities is not linked to another entity in table 840 the Deletelink API removes that entity's record from the integration entity instance table 830. This step is illustrated at block 1085. When an entity is removed from the integration entity instance table, a copy of the entry's record is made in the history table 860. This step is illustrated at block 1090.

Figure 10A:
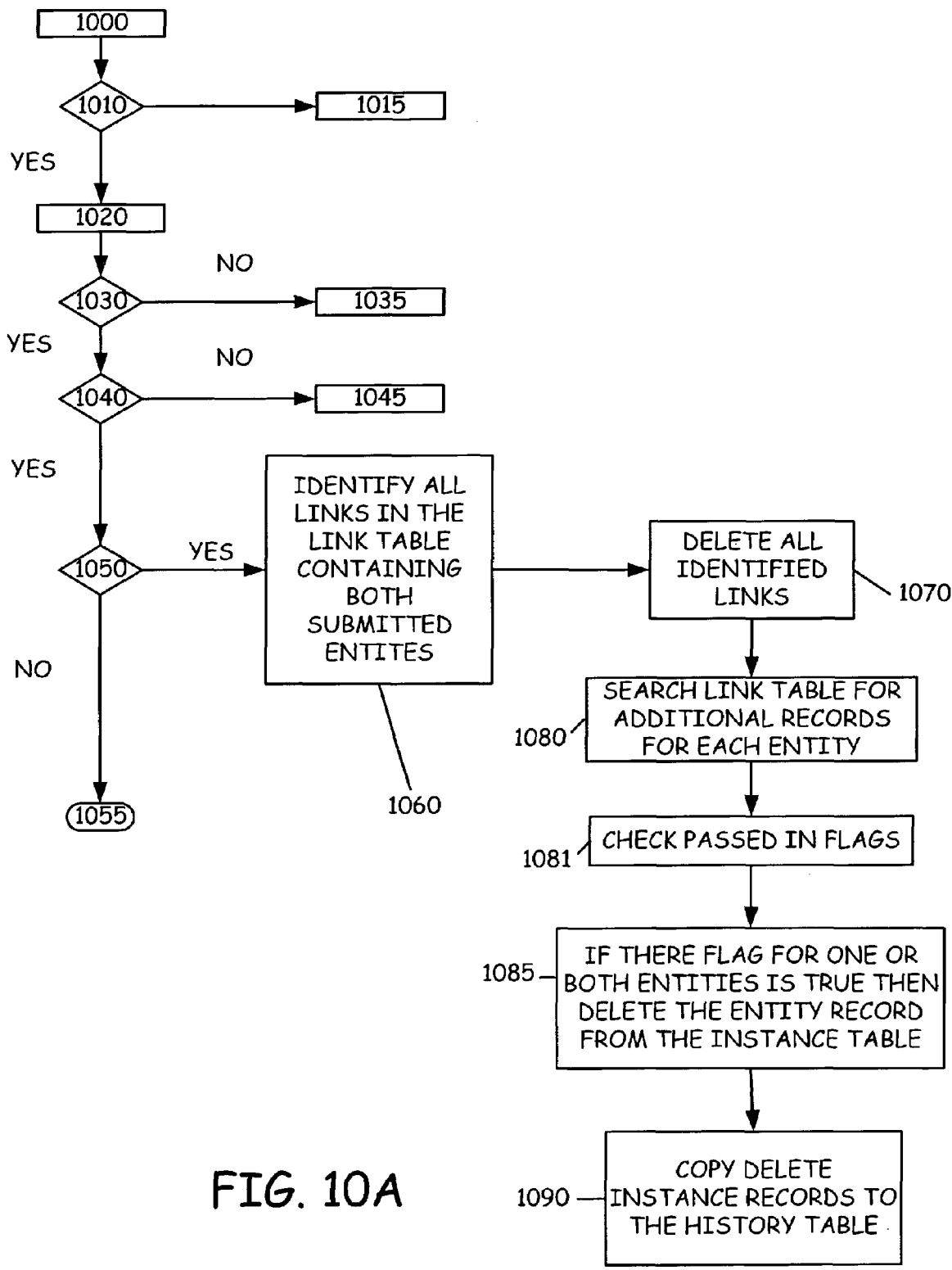

FIG. 10A is a flow diagram illustrating the steps performed by the linker 650 when the Breaklink API is executed. The Breaklink API is similar to Deletelink API discussed in FIG. 10, except that while the Breaklink API removes the links in link table 840, and it can only remove instance records form the instance table 830 if a specific instruction to remove the instance is provided. For purposes of simplicity of the discussion, common elements or steps between the Breaklink API and the DeleteLink API will not be discussed below, and will be referred to with the same reference numbers.

When the Breaklink API is called the program first gathers the datasource connection. During this step the Breaklink API gathers the parameters for the entities from each of the systems having entities that are to be linked. One of the parameters that are passed into the Breaklink API is an indication that one or both of the instances contained in the link are to be deleted from the instance table 830. For example, this indication can be a true/false flag where true indicates that the instance can be removed. This step is illustrated at block 1000. If the datasource connections cannot be found, for example, one of the requested entities does not exist in the system, the Breaklink API will throw an exception to an error log. This step is illustrated at blocks 1010 and 1015.

If the record is found the Breaklink API identifies all of the links in link table 840 having the unique ID 831 of the instance table 830 for the submitted entities. This step is illustrated at block 1060. The Breaklink API then deletes each entry in the link table 840 for each record in the table 840 that matches the submitted entities. This deletion is illustrated at block 1070. Following the deletion of the links in the link table 840, the Breaklink API then searches the link table 840 for each entity submitted, and checks if each of the submitted entities is linked to another entity (i.e. does the entity appear in another record separate from the submitted entities), at block 1080. Next the Breaklink API checks the passed in flags (or other indication) to determine if the instance can be removed. This is illustrated at block 1081. If one of the submitted entities is not linked to another entity in table 840, and the flag indicates that the entity can be removed, the Breaklink API removes that entity's record from the integration entity instance table 830 by invoking the DeleteInstance API discussed below. This step is illustrated at block 1085. As discussed above, when an entity is removed from the integration entity instance table, a copy of the entry's record is made in the history table 860. This step is illustrated at block 1090.

Figure 11:
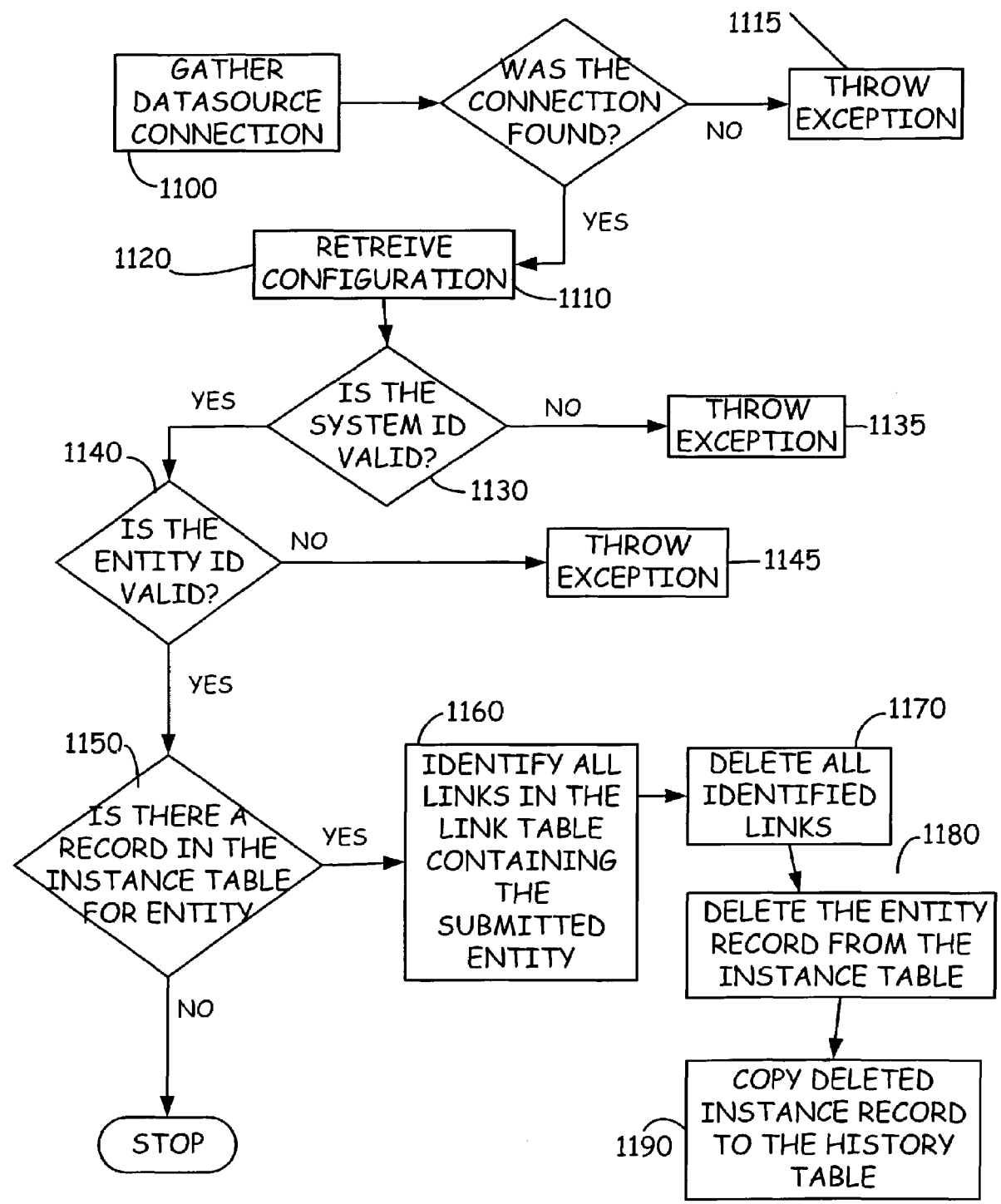
FIG. 11 is a flow chart illustrating the steps performed by the linker when the DeleteInstance API is executed.

FIG. 11 is a flow diagram illustrating the steps performed by the linker 650 when the DeleteInstance API is executed. The DeleteInstance API is similar to the Deletelink. API except that the DeleteInstance API only deletes the entity record and associated links for the identified entity. Blocks 1100 to 1145 of FIG. 11 are identical to blocks 1000 to 1045 of FIG. 10 and represent similar processes.

Following the verification of the system ID and the entity ID for the submitted entity, the DeleteInstance API determines if there is an integration entity instance record for the entity. This step is illustrated at block 1150. If a record is found for the entity, the DeleteInstance API searches the link table 840 and identifies all of the links in link table 840 having the unique ID 831 of the submitted entity. This step is illustrated at block 1160. The DeleteInstance API then deletes each entry in the link table 840 that includes the submitted entity. This step is illustrated at block 1170. In an alternative embodiment, the DeleteInstance API only deletes the instance from the instance table if the instance has no link entries in the link table 840. Following the deletion of the records in the link table 840, the DeleteInstance API deletes the associated record for the submitted entity in the instance table 830 at block 1180. At the time the entity record is deleted from the integration entity instance table 830, a copy of the entry record is made in the history table 860. This step is illustrated at block 1190. However, unlike the DeleteLink API the DeleteInstance API does not check to see if the other entities have links remaining in the link table 840.

Figure 12:
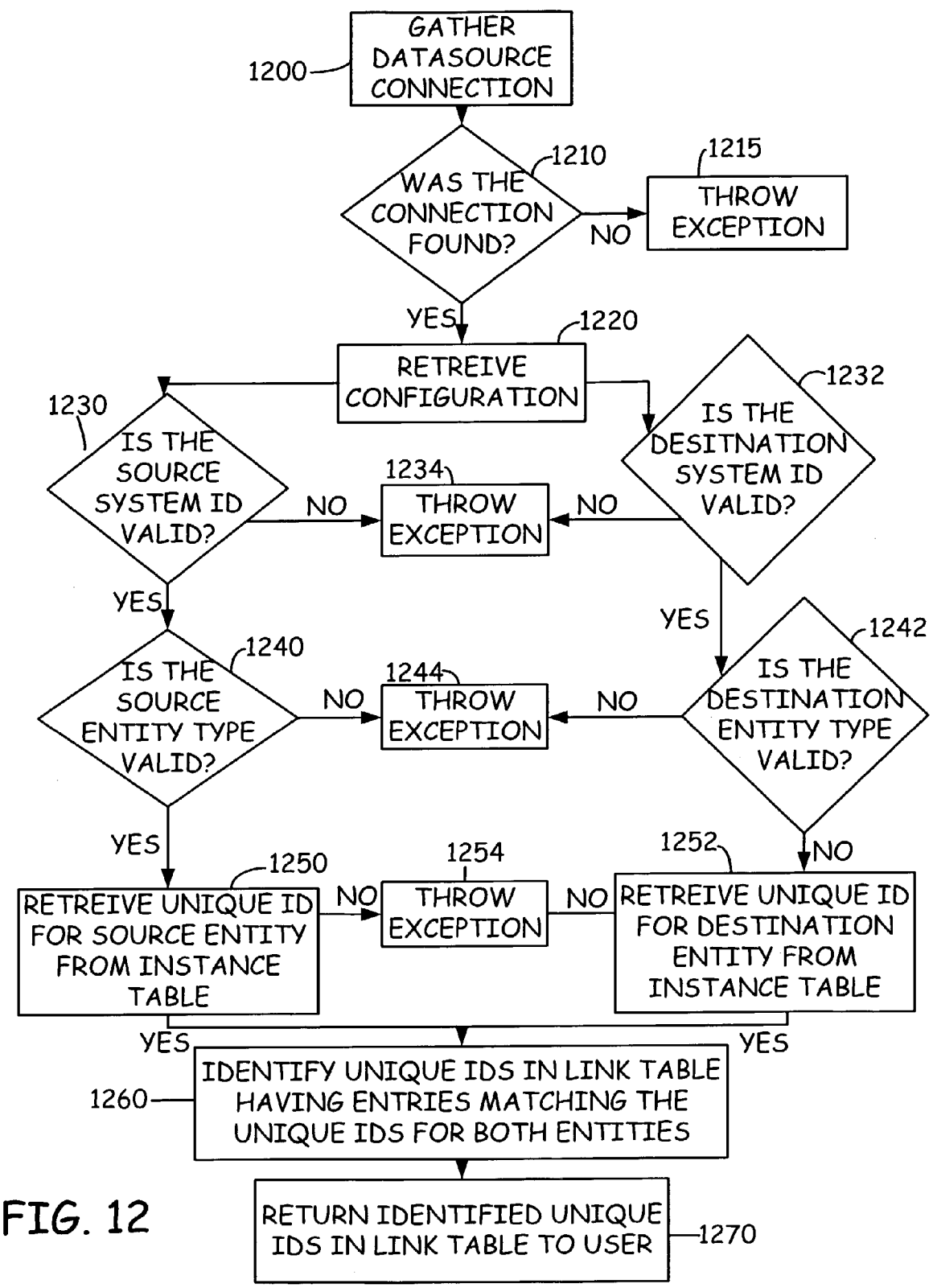
FIG. 12 is a flow chart illustrating the steps executed by the linker when the GetDestinationLink API is executed.

FIG. 12 is a flow diagram illustrating the steps executed by the linker 650 when the GetDestinationLink API is executed. The GetDestinationLink API is a module that returns to the user or other component of the messaging service 600, a collection of entities that are linked to the submitted entities. The GetDestinationLink API is invoked when an update occurs to one entity and the system desires to update all entities linked to the updated entity. When the GetDestinationLink API is invoked by the linker 650 the API gathers the datasource connection for the submitted entity. This is illustrated at block 1200. If the API cannot find the datasource connection of the submitted entity, at block 1210, the GetDestinationLink API throws an exception at block 1215. If the GetDestinationLink API located the datasource connection, the configuration information for the datasource connection is retrieved. This step is illustrated at block 1220.

Once the configuration information is retrieved, the GetDestinationLink API checks that the source system ID and the destination system ID are valid at blocks 1230 and 1232. The GetDestinationLink API also checks the validity of the entity types for both the source and destination. These steps are illustrated at blocks 1240 and 1242, respectively. If the IDs or the entity types are not valid the GetDestinationLink API throws an exception at blocks 1234 and 1244, respectively. The GetDestinationLink API then retrieves the unique ID 831 of the source entity from the integration entity instance table 830. This is illustrated at block 1250. If this unique ID 831 is not found the GetDestinationLink API throws an exception at block 1254. This process is repeated for the entity of the destination system at block 1252.

Following the retrieval of the unique ID from the instance table 830 the GetDestinationLink API searches the link table 840 and identifies all records having the unique ID 831 of the submitted source entity. The GetDestinationLink API also identifies all records having the unique ID 831 for the destination entity. This gathering of unique Ids is illustrated at block 1260. The GetDestinationLink API then returns to the user the results of the search. This is illustrated at block 1270. If no entities are found in the link table during the search the GetDestinationLink API returns as results of the search a default link value, that is stored in the instance table 830. If the default link value is not present then the API returns no value for the results.

The GetDestinationLink API can also be invoked in an overloaded configuration. In the overloaded configuration the GetDestinationLink API is provided with less than all of the parameters in the instance table 830. For example, the GetDestinationLink API can be provided with the system ID and entity type. The GetDestinationLink API will then identify at blocks 1250 and 1252 those unique IDs 831 in the instance table 830 that match the two parameters provided. Then, at block 1270, the API will return as results all entries that match the identified unique IDs 831.

Figure 13:
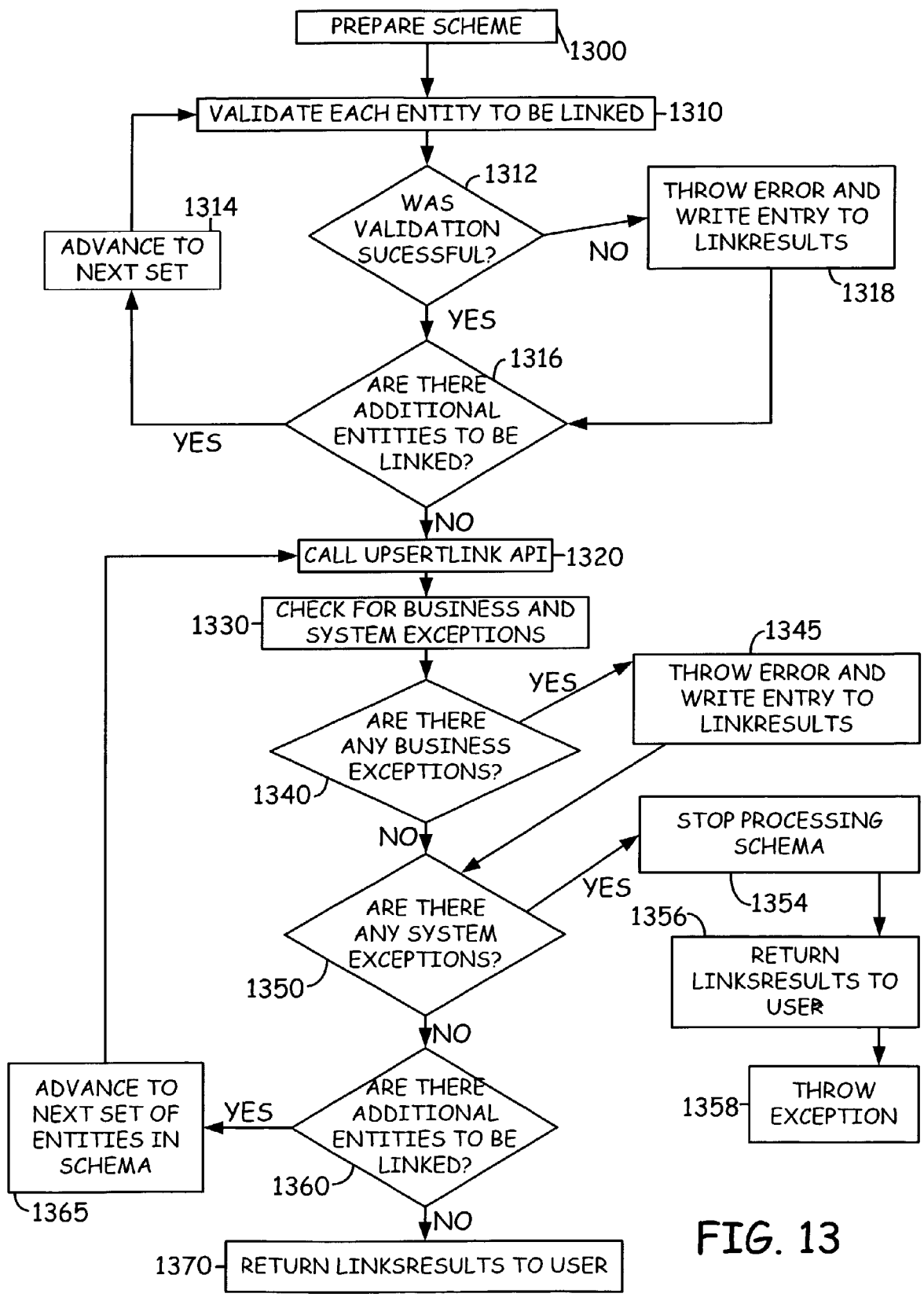
FIG. 13 is a flow chart illustrating the steps executed by the linker when the Load API is executed.

FIG. 13 is a flow diagram illustrating the steps executed by the linker 650 when the Load API is invoked. The Load API is a basic bulk load module that performs the same function as the UpsertLink API. However, the Load API allows for multiple entities and links to be entered in the tables 830 and 840 with one call. The entities that are to be linked are provided in a schema that is readable by the Load API. In one embodiment the schema is an XML schema.

The Load API receives the schema containing the sets of entities to be linked in link table 840 at block 1300. For each link that is to be created, the Load API validates each of the entities that are to be linked. This validation is illustrated at block 1310. If the entities cannot be validated an error is thrown at block 1314, and an entry is made in a linkresults file. The Load API repeats this validation process until all of the sets of entities in the schema have been validated. This is illustrated at blocks 1316 and 1318.

Once all of the sets of entities in the schema have been validated, the Load API calls the UpsertLink API for each set of entities that were successfully validated. This calling of the UpsertLink is illustrated at block 1320. During the UpsertLink call, the Load API checks for any business exceptions that may occur, and checks for any system exceptions that may occur. This check is illustrated at block 1330. However, other exemptions can be checked at block 1330.

If a business exception occurred the Load API adds a result of the exception to the linksresult file. This is illustrated at blocks 1340 and 1345. Following the reporting of any business exception the Load API advances to the next set of entities to be linked at blocks 1360 and 1365. If a system exception occurs, at block 1350, the Load API adds a system error to the linkresults file at block 1352. Then the Load API stops processing the links in the schema at block 1354, and returns the linksresults file to the user at block 1356. Then the Load API throws an exception to the linker 650 at block 1358 to stop the linker 650.

Following the successful processing of the schema, the Load API returns to the user the contents of the linksresults file to the user at block 1370. If there were no business exceptions or validity problems the Load API returns an empty linksresult file to the user. If there were exceptions, then the user can view the contents of the file and correct any problems identified.

In summary, the present invention is directed to a linking system that assists in managing the linking of entities contained in messages between two business applications. The linking system of the present invention also assists in the updating of entities between two business applications when an entity is updated in one application.

Messages are picked up by a receive function from a message queue and processed by a preprocessor. While the message is in the preprocessor, the message is processed to identify various features of the message necessary to post the message to the destination system. Once the preprocessing is finished the message is returned to the receive function.

The message is then passed from the receive function to the channels, and processed through channels in the integration server. The channels transform the message according to a predefined process. This process transforms the message from a format that is useable by the source system to a format that is useable by the destination system. Once the message is transformed it is delivered to a pipeline.

When the message reaches the pipeline the message is posted to the destination system. Following a successful posting of the message, the pipeline receives a confirmation back that the post was successful. Contained in this confirmation are associated parameters related to the entities created in the destination system. The pipeline then invokes a linker to establish links in a link table between related entities in the source and the destination application programs. The linker includes several protocols that manage the entry of entities in the link tables. Using these protocols the linker takes information regarding the entities from both application programs, and creates two records in a first (instance) table and one record in a second (link) table that represents the links between the two records based upon their entries in the first table. The linker establishes these links in the table by calling on modules contained in the linker. The linker can also update the records in the first table if a record previously existed for the entity.

Another feature of the present invention is a linker that includes a series of meta data tables that store information about the two systems or multiple systems that have information that is being integrated. The linker records for each entity in each system being integrated with entities in other system. It also includes several modules or APIs which allow for manipulation of the data and records stored in the tables. These modules includes a module for inserting links and entities into the tables, a module for removing links in the tables, a module for removing an entity and associated links from the tables, a module for bulk loading entities and links into the tables, and a module for reporting the entities that are linked in the tables.

Although the present invention has been described with reference to particular embodiments, workers skilled in the art will recognize that changes may be made in form and detail without departing from the spirit and scope of the invention.

What is claimed is:

1. A computer executable method of linking a first entity in a source application program with a second entity in a destination application program, the method comprising:
   receiving from the source application program, at an integration component, a document containing information representing the first entity in the source application program;
   transforming the document, using a processor of the computer, from a first format associated with the source application program to a second format associated with the destination application program, wherein transforming is performed by the integration component;
   posting the transformed document to the destination application program;
   in response to posting the transformed document to the destination program, receiving from the destination application program, at the integration component, information representing the second entity in the destination application program;
   creating a plurality of records in an instance table for a plurality of entities, wherein each of the plurality of records comprises an entry for a particular entity of the plurality of entities, the entry including a source system ID that identifies one of the source and destination application programs that created the particular entity, an entity ID that identifies the particular entity, and an entity type that identifies a type of the particular entity, wherein creating the plurality of records comprises:
      creating a first record in the instance table for the first entity, the first record in the instance table including information that identifies the first entity and the source application program, wherein if the source system ID for the entry of the first record is provided as a source system name, querying the source application program that created the first entity, searching a system table for the source system name, identifying a corresponding system ID for the source system name in the system table, and returning to the integration component the corresponding system ID;
      creating a second record in the instance table for the second entity, the second record in the instance table including information that identifies the second entity and the destination application program; and
   creating a link record in a link table including an entry that links the first record and an entry for the second record.

2. The method of claim 1, wherein the document comprises a message containing information to create the second entity in the destination application program.

3. The method of claim 1 wherein creating the first and the second records in the instance table further includes assigning a unique ID in the instance table to each record.

4. The method of claim 3 wherein creating a link record in the link table further includes assigning a unique ID for the link record, assigning the entry for the first record the unique ID of the first record, and assigning the entry for the second record the unique ID of the second record.

5. The method of claim 1, wherein receiving information representing the second entity comprises:
   in response to posting the document to the destination application program, receiving information at the integration component with respect to posting the document to the destination application program.

6. The method of claim 5, wherein receiving information at the integration component with respect to posting the document comprises:

receiving an indication at integration component that indicates whether the document was successfully posted to the destination application program.

7. The method of claim 6, wherein creating a link record is performed if the indication received at the integration component indicates the posting was successful.

8. A computer executable method for creating a link between a first entity in a first application program and a second entity in a second application program, the method comprising:

identifying a plurality of entities in the first and second application programs to be linked, wherein identifying comprises receiving a schema containing the plurality of entities to be linked, the plurality of entities being grouped in sets, each set comprising at leant one entity in the first application program and at least one entity in the second application program;

validating each set of entities, wherein if the set of entities cannot be validated writing an error to a results file;

after receiving the schema and validating each set of entities, gathering a data source connection for each of the plurality of entities to be linked;

retrieving a configuration for each of the plurality of entities to be linked;

for each set of entities to be linked, performing an ID check to determine if an ID associated with each entity in the set is valid;

determining if a record for each entity in the set exists in instance table;

if a record is not found for a particular entity in the set, creating record in the instance table for the entity, wherein the record includes information identifying the entity and one of the first and second application programs that created the entity;

determining if a link record exists linking the set of entities in a link table;

creating a link record, using a processor of the computer, indicative of the set of entities in the link table if no corresponding record is found in the link table linking the set of entities; and after creating a record in the link table, checking each set of entities for exceptions and returning any exceptions to a user, wherein checking for exceptions checks for at least one of business exceptions and system exceptions, and wherein if an exception is found, writing an entry indicative of the exception to the results file, wherein returning any exceptions returns the results file to the user.

9. The method of claim 8 further comprising:

for each entity to be linked, if a record for the entity is found in the instance table, updating the record in the instance table.

10. The method of claim 8 wherein creating a record in the instance table further includes, creating a plurality of entries in the record including entries for a system ID, an entity ID, and an entity type.

11. The method of claim 10 wherein creating a record in the instance table further includes, assigning the record a unique ID.

12. The method of claim 11 wherein creating a record in the link table further includes:

assigning the record a unique ID in a first column of the link table;

inserting the unique ID of the first record in a second column of the link table; and inserting the unique ID of the second record in a third column of the link table.

13. The method of claim 10 wherein creating a record in the instance table includes assigning a time stamp to the record indicative of when the record was created in the table.

14. The method of claim 8 wherein performing the ID check includes checking a system ID for the entity.

15. The method of claim 8 wherein performing the ID check includes checking an entity ID for the entity.

16. The method of claim 8 wherein performing the ID check includes checking both an entity ID and a system ID for the entity.

17. The method of claim 8 wherein if a system exception is found returning the results file to the user, and stopping the method.

18. A computer readable storage medium containing computer executable instructions that, when executed, cause a computer to perform a method comprising:

receiving at an integration component a document including information contained in a first entity representing an entity in a first application program, wherein the document is received from the first application program;

transforming the document, using a processor of the computer, from a first format associated with the first application program to a second format associated with a second application program, wherein transforming is performed by the integration component;

posting the transformed document to the second application program;

receiving at the integration component information contained in a second entity representing an entity in the second application program, wherein the information contained in the second entity is received from the second application program;

creating a plurality of records in an instance table for a plurality of entities, wherein each of the plurality of records comprises an entry for a particular entity of the plurality of entities, the entry including a source system ID that identifies one of the first and second application programs that created the particular entity, an entity ID that identifies the particular entity, and an entity type that identifies a type of the particular entity, wherein creating the plurality of records comprises:

creating a first record in the instance table for the first entity, and a second record in the instance table for the second entity, wherein if the source system ID for the entry of the first record is provided as a source system name, querying the first application program that created the first entity, searching a system table for the source system name, identifying a corresponding system ID for the source system name in the system table, and returning to the integration component the corresponding system ID; and creating a link record in a link table that associates the first application program with the second application program, the link record including an entry for the first record and an entry for the second record.

19. The computer readable medium of claim 18 wherein creating the first and the second records in the instance table further includes assigning a unique ID in the instance table to each record.

20. The computer readable medium of claim 19 wherein creating a link record in the link table further includes assigning a unique ID for the link record, assigning the entry for the first record the unique ID of the first record, and assigning the entry for the second record the unique ID of the second record.

21. A computer readable storage medium containing computer executable instructions that, when executed, cause a computer to perform a method comprising:

receiving an indication of a set of entities that are to be linked, the set of entities comprising at least one entity from a first application program and at least one entity from a second application program, wherein receiving an indication comprises receiving a schema containing a plurality of entities to be linked, the plurality of entities being grouped in sets;

validating the set of entities, wherein if the set of entities cannot be validated writing an error to a results file;

for each entity in the set to be linked,
performing an ID check to determine if an ID of the entity is valid;
determining if a record for the entity exists in an instance table; and
creating a record in the instance table for the entity if no record is found, wherein creating a record in the instance table comprises creating a plurality of entries in the record including entries for a system ID associated with the entity, an entity type associated with the entity, an entity ID of the entity, and a time stamp indicative of when the record was created in the table; and determining if a link record exists linking the set of entities in a link table;

creating a link record in the link table, using a processor of the computer, that links the set of entities if no corresponding record is found in the link table linking the set of entities; and after creating a record in the link table, checking the set of entities for exceptions and returning any exceptions to a user, wherein checking for exceptions checks for at least one of business exceptions and system exceptions, and wherein if an exception is found, writing an entry indicative of the exception to the results file, wherein returning any exceptions returns the results file to the user.

22. The computer readable medium of claim 21, wherein the method comprises:
gathering a data source connection for each entity to be linked; and
retrieving a configuration for each of the entities to be linked.

23. The computer readable medium of claim 21, wherein the method comprises:
if a record for the entity is found in the instance table, updating the record in the instance table.

24. The computer readable medium of claim 21 wherein creating a record in the instance table further includes, assigning the record a unique ID.

25. The computer readable medium of claim 24 wherein creating a record in the link table comprises:
assigning the record a unique ID in a first column of the link table;
inserting the unique ID of the first record in a second column of the link table; and
inserting the unique ID of the second record in a third column of the link table.

26. The computer readable medium of claim 21 wherein performing the ID check includes checking a system ID for the entity.

27. The computer readable medium of claim 21 wherein performing the ID check includes checking an entity ID for the entity.

28. The computer readable medium of claim 21 wherein if a system exception is found returning the results file to the user, and stopping the method.

* * * * *

UNITED STATES PATENT AND TRADEMARK OFFICE
CERTIFICATE OF CORRECTION

| | | |
|---|---|---|
| PATENT NO. | : 7,614,057 B2 | Page 1 of 1 |
| APPLICATION NO. | : 10/435629 | |
| DATED | : November 3, 2009 | |
| INVENTOR(S) | : Kevin Whittenberger et al. | |

It is certified that error appears in the above-identified patent and that said Letters Patent is hereby corrected as shown below:

In column 22, line 21, in Claim 1, after "destination" insert -- application --.

In column 23, line 4, in Claim 6, after "at" insert -- the --.

In column 23, line 18, in Claim 8, delete "leant" and insert -- least --, therefor.

In column 23, line 32, in Claim 8, before "instance" insert -- an --.

In column 23, line 35, in Claim 8, after "creating" insert -- a --.

Signed and Sealed this

Fifteenth Day of February, 2011

David J. Kappos
*Director of the United States Patent and Trademark Office*